(12) United States Patent
Kuroki et al.

(10) Patent No.: US 7,204,333 B2
(45) Date of Patent: Apr. 17, 2007

(54) SUSPENSION ARRANGEMENT STRUCTURE FOR VEHICLE

(75) Inventors: Masahiro Kuroki, Wako (JP); Shinji Takayanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 10/734,830

(22) Filed: Dec. 11, 2003

(65) Prior Publication Data

US 2004/0227321 A1 Nov. 18, 2004

(30) Foreign Application Priority Data

Dec. 20, 2002 (JP) .............................. 2002-369477

(51) Int. Cl.
*B62D 9/02* (2006.01)

(52) U.S. Cl. ............... 180/210; 180/375; 280/124.134; 475/200; 475/220

(58) Field of Classification Search ................ 180/374, 180/375, 210, 215; 280/124.103, 124.13, 280/124.156, 124.134, 124.162, 124.179, 280/124.157; 475/200, 220, 222, 251
See application file for complete search history.

(56) References Cited

U.S. PATENT DOCUMENTS

| | | | | |
|---|---|---|---|---|
| 3,598,385 | A | * | 8/1971 | Parsons, Jr. .................... 267/30 |
| 4,360,224 | A | * | 11/1982 | Sato et al. .................... 280/269 |
| 4,470,611 | A | * | 9/1984 | Duphily et al. ............. 280/104 |
| 4,676,123 | A | * | 6/1987 | Kubo et al. .................. 475/205 |
| 4,778,199 | A | * | 10/1988 | Haggerty et al. ...... 280/124.102 |
| 4,798,254 | A | * | 1/1989 | Lings .......................... 180/58 |
| 4,902,033 | A | * | 2/1990 | Tonomura ............ 280/124.138 |
| 5,156,070 | A | * | 10/1992 | Fukuda et al. ............. 74/606 R |
| 5,199,526 | A | * | 4/1993 | Derviller .................... 180/297 |
| 5,364,114 | A | * | 11/1994 | Petersen ............... 280/124.151 |
| 5,558,361 | A | * | 9/1996 | Shin ....................... 280/124.15 |
| 5,829,542 | A | * | 11/1998 | Lutz ............................ 180/65.6 |
| 6,286,619 | B1 | * | 9/2001 | Uchiyama et al. .......... 180/337 |
| 6,510,916 | B2 | * | 1/2003 | Hori et al. ................... 180/374 |
| 6,533,060 | B1 | * | 3/2003 | Seto ............................ 180/337 |
| 6,732,830 | B2 | * | 5/2004 | Gagnon et al. ............. 180/291 |
| 6,827,361 | B2 | * | 12/2004 | Seki ..................... 280/124.134 |

(Continued)

FOREIGN PATENT DOCUMENTS

EP 0 626 307 A1 * 5/1993

(Continued)

*Primary Examiner*—Paul N. Dickson
*Assistant Examiner*—George D. Spisich
(74) *Attorney, Agent, or Firm*—Hamre, Schumann, Mueller & Larson PC

(57) ABSTRACT

A differential mechanism is arranged below an infinitely variable transmission and a reduction gear mechanism. Front fitting parts and rear fitting parts for fitting suspension arms to a vehicle frame are arranged to the front and rear of the deferential mechanism. Even though the left and right suspension arms swing up and down, or a transmission and a reduction gear mechanism attached on a vehicle frame swing left and right with respect to the suspension arms, there is no interference of the transmission and the reduction gear mechanism with the suspension arms due to a space at the front and the rear of a differential mechanism, so that the vehicle frame can swing left and right and it is also possible to easily constitute a vehicle having an independent suspension.

14 Claims, 23 Drawing Sheets

U.S. PATENT DOCUMENTS

2004/0144591 A1* 7/2004 Kuroki et al. .............. 180/337

FOREIGN PATENT DOCUMENTS

| EP | 1 403 172 A1 | * | 9/2003 |
| EP | 1 378 428 A1 | | 1/2004 |
| FR | 2680733 | * | 3/1993 |
| GB | 1240506 | * | 7/1971 |

* cited by examiner

EMBODIMENT

COMPARATIVE EXAMPLE

EMBODIMENT

FIG.22A
COMPARATIVE EXAMPLE
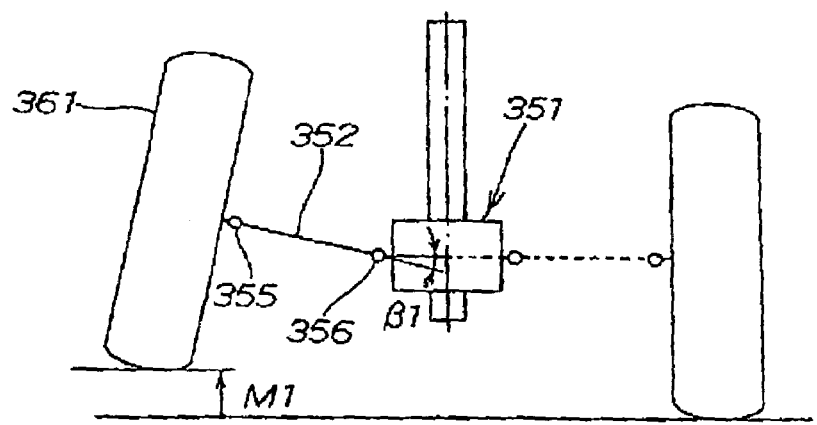
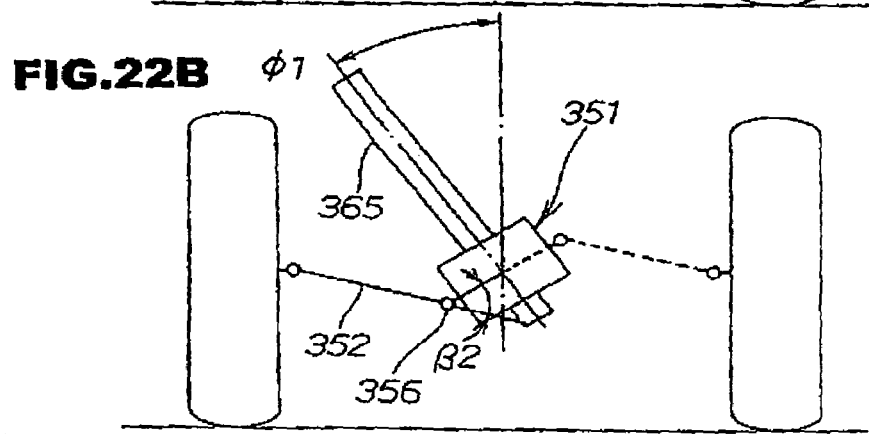
FIG.22B
FIG.22C
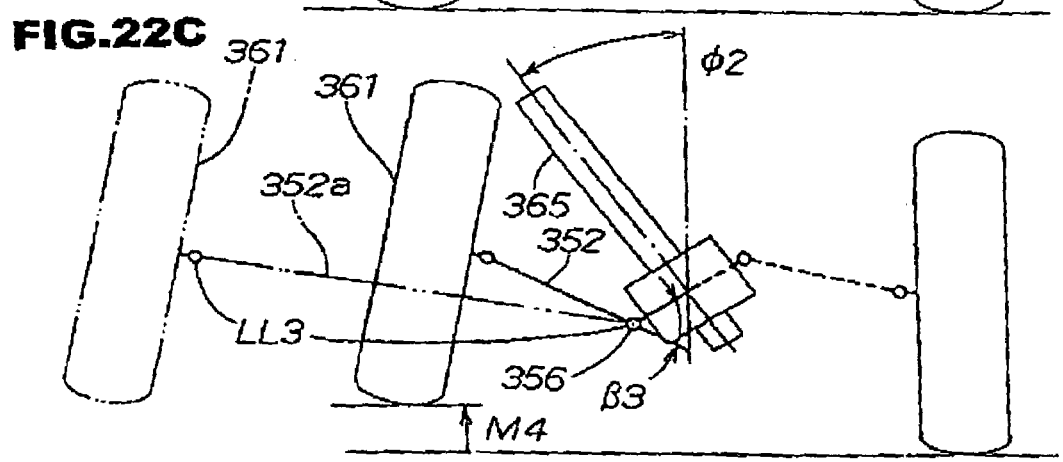

SUSPENSION ARRANGEMENT STRUCTURE FOR VEHICLE

FIELD OF THE INVENTION

The present invention relates to a suspension arrangement structure for a vehicle capable of easily constructing an independently swinging suspension type three-wheeled vehicle.

BACKGROUND OF THE INVENTION

As a power unit mounted on a vehicle, a suspension arrangement structure equipped with a belt-type infinitely variable transmission and a differential gear is well known. For example, Japanese Utility Model Publication Laid-open No. 62-54891 is related art and is described with reference to FIG. 23 below. FIG. 23 is a side view showing the structure of a power unit of the related art, where a power unit 300 mounted on a scooter type three-wheeled vehicle comprises an engine 301 and a transmission unit 303 linked to a crankshaft 302 of the engine 301, and has a wrapping transmission 304 housed in the transmission case of the transmission unit 303. Left and right driving wheels 311 are linked to the rear lower section of the wind-type transmission 304, via a gear reduction mechanism 306, a differential gear 307, and an axle arm 308.

The above mentioned axle arm 308 is directly fitted from the differential gear 307 to the driving wheels 311, so that the left and right driving wheels move up and down integrally. For example, when one of the driving wheels 311 runs over a bump on the surface of a road, the driving wheel 311 moves upwards. The axle arm 308 therefore tilts and the vehicle body rolls. Such a structure does not have a problem when being adopted in a vehicle with small displacement. However, since ride quality is affected when being adopted in a vehicle with middle or more displacement capable of high speed operation, the structure required improvement.

With the above mentioned three-wheeled vehicle, it is also required to have a structure capable of swinging the vehicle body left and right in order to obtain the same driving performance as that of two-wheel vehicle. For example, the left and right driving wheels 311 are supported by an independent suspension arm to be independent suspension. Also, even when a vehicle body equipped with a power unit is swung to the left and right, if it is possible to prevent the suspension arm from interfering with the power unit, a swinging three-wheeled vehicle with improved comfortable ride can be achieved.

The object of the present invention is to easily construct an independently swinging suspension type three-wheeled vehicle by improving a suspension arrangement structure for a vehicle.

SUMMARY OF THE INVENTION

In order to achieve the above object, there is provided a suspension arrangement structure for a vehicle for transmitting drive force to wheels from an engine side in the order of a transmission, a reduction gear mechanism and a differential mechanism, having a vehicle frame mounted with left and right suspension arms in a moveable manner, each suspension arm being attached to a wheel, wherein the differential mechanism is arranged below the transmission and the reduction gear mechanism, and the suspension arms are arranged to the front and rear of the differential mechanism.

It is possible to arrange a fitting part for suspension arms in a space at the front and the rear of a differential mechanism arranged below a transmission and a reduction gear mechanism, so that even though the left and right suspension arms swing up and down, or the transmission and the reduction gear mechanism attached on the vehicle frame swing left and right with respect to the suspension arms, the transmission and the reduction gear mechanism do not interfere with the suspension arms and the vehicle frame can swing left and right so that it is possible to easily construct a vehicle having an independent suspension.

BRIEF DESCRIPTION OF THE DRAWINGS

FIGS. 22A–C are explanatory drawings for describing a drive shaft of a comparative example.

DETAILED DESCRIPTION OF THE INVENTION

Figure 1:
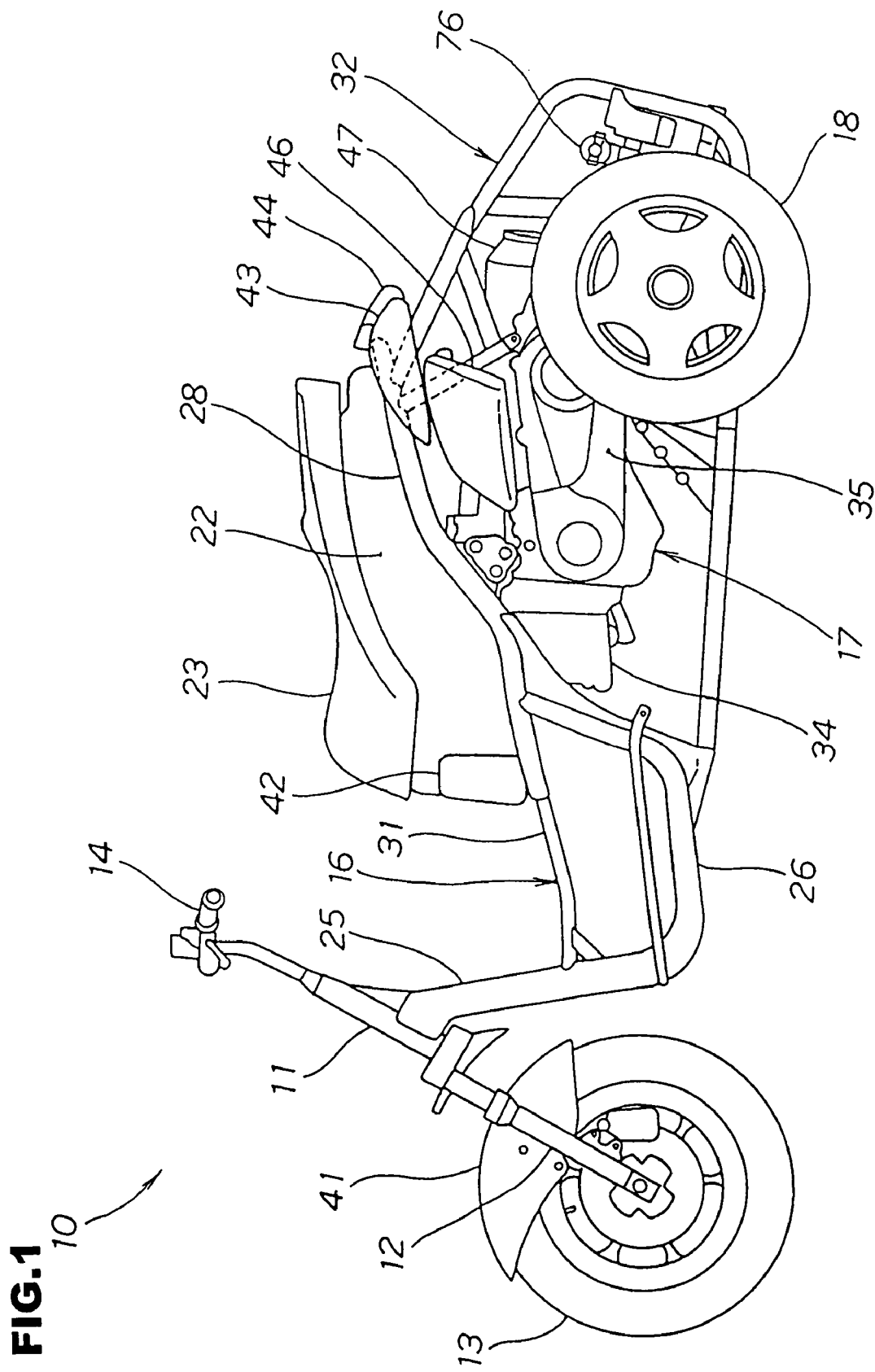
FIG. 1 is a side view of a vehicle adopting a suspension arrangement structure of the present invention.

Embodiments of the present invention will now be described with reference to the drawings. The drawings should be viewed in the direction of orientation of the reference numerals.

FIG. 1 is a side view of a vehicle adopting a suspension arrangement structure of the present invention. Here, a three-wheeled vehicle with a swing mechanism 10 (hereinafter referred as a "three-wheeled vehicle 10") comprises a front fork 12 steerably attached to a head pipe 11 via a handlebar shaft (not shown), a front wheel 13 attached to the lower end of the front fork 12, a handlebar 14 integrally attached to the front fork 12, a vehicle frame 16 attached to the rear section of the head pipe 11, a power unit 17 attached to the rear section of this vehicle frame 16, rear driving wheels 18 and 21 (the rear driving wheel 21 for the inner side is not shown) as left and right wheels driven by the power unit 17, a storage box 22 attached to the upper section of the vehicle frame 16 and a seat 23 attached to the upper section of this storage box 22 so as to be capable of opening and closing.

A vehicle frame 16 comprises a down pipe 25 extending to the rear and diagonally downwards from the head pipe 11, a pair of left and right lower pipes 26, 27 (the lower pipe 27 for the inner side is not shown) extending to the rear and diagonally upwards further rearwards from the bottom of the down pipe 25, a center upper frame 28 linked to the rear of the lower pipes 26, 27, a center pipe 31 extending to the rear from the down pipe 25 and linked to the center upper frame 28 and a J frame 32 having a J-shape when viewed from the side linked respectively to the rear of the lower pipes 26, 27 and the rear side of the center upper frame 28.

The center upper frame 28 is a member for supporting the storage box 22 and suspending the power unit 17. The J frame 32 is a member for fitting a rear suspension for suspending the rear wheels 18, 21 and a swing mechanism permitting left and right swinging of the vehicle frame 16 side with respect to the rear suspension side. These rear suspension and swing mechanism will be described later.

The power unit 17 comprises an engine 34 arranged on the front side of the vehicle and a power transmission mechanism 35 for transmitting the power of this engine 34 to the rear wheels 18, 21. Here, numeral 41 is a front fender covering the upper section of the front wheel 13, numeral 42 is a battery, numeral 43 is a blinker, numeral 44 is a tail lamp, numeral 46 is an air cleaner and numeral 47 is a muffler.

Figure 2:
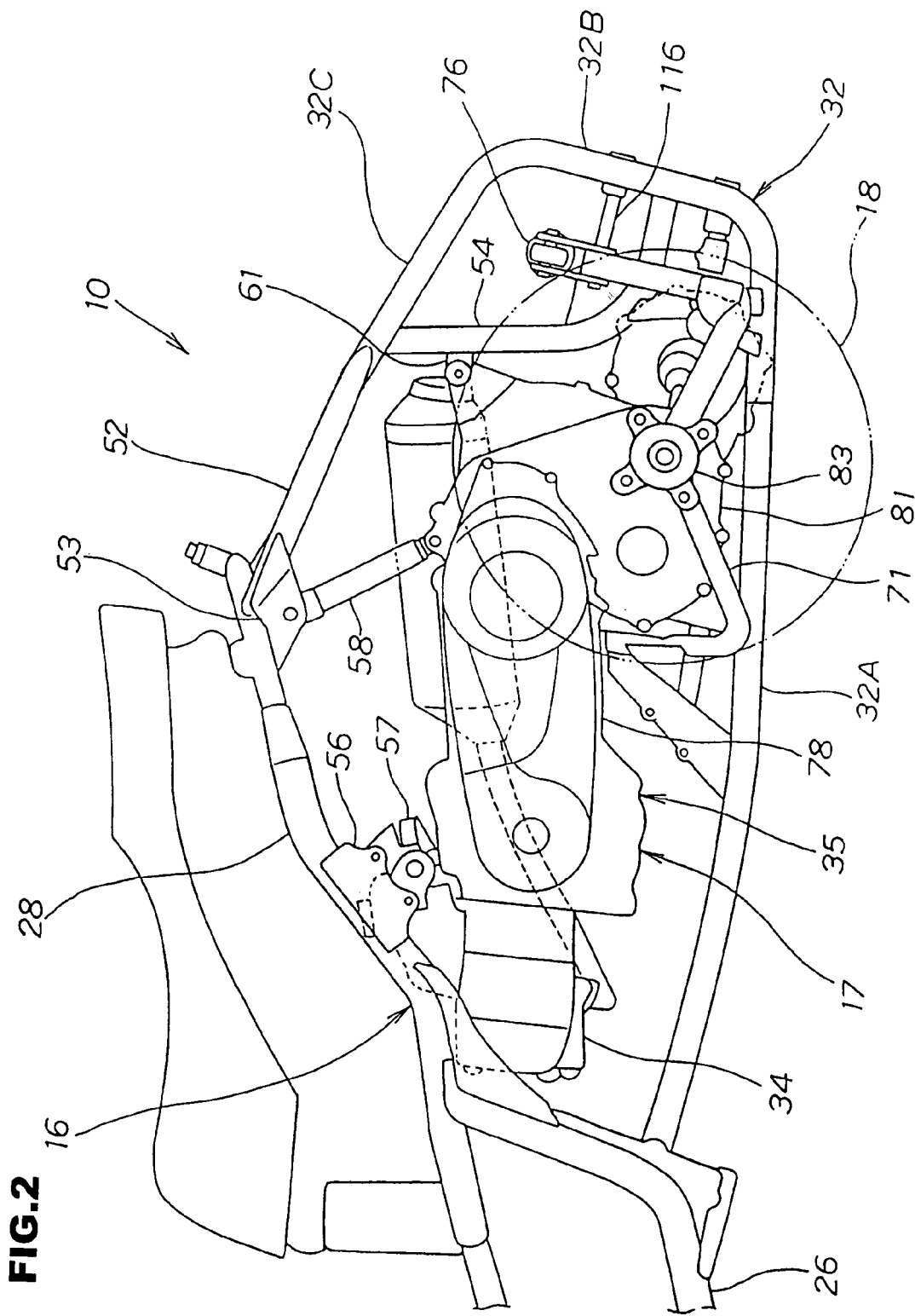
FIG. 2 is a side view of essential parts of a three-wheeled vehicle of the present invention.

FIG. 2 is a side view of essential parts of a three-wheeled vehicle of the present invention. FIG. 2 shows that linking pipes 52, 52 (the linking pipe 52 for the inner side is not shown) span over the J frame 32 and the center upper frame 28, respectively, in order to link the upper section of the J frame 32 and the rear end of the center upper frame 28, reinforcing plates 53, 53 are attached to these linking pipes 52, 52 and the center upper frame 28, an L pipe 54 being substantially L-shaped when viewed from the side is attached inside the rear section of the J frame 32, the center upper frame 28 is fitted with brackets 56, 56 (the bracket 56 for the inner side is not shown), these brackets 56, 56 are attached with the front upper section of the power unit 17 via a joint member 57, the rear section of the power unit 17 is supported by extending a supporting rod 58 downwards and diagonally rearwards from the reinforcing plates 53, 53, and the rear end part of the power unit 17 is attached by extending a projection 61 from the front section of the pipe 54 frontward. Numerals 32A, 32B and 32C are parts of the J frame 32, respectively, a substantially horizontal lower horizontal part, a rear end inclined part having an upper end side arranged further rearwards than the lower end side, and an upper inclined part having a front end part arranged further upwards than the rear end part.

Figure 3:
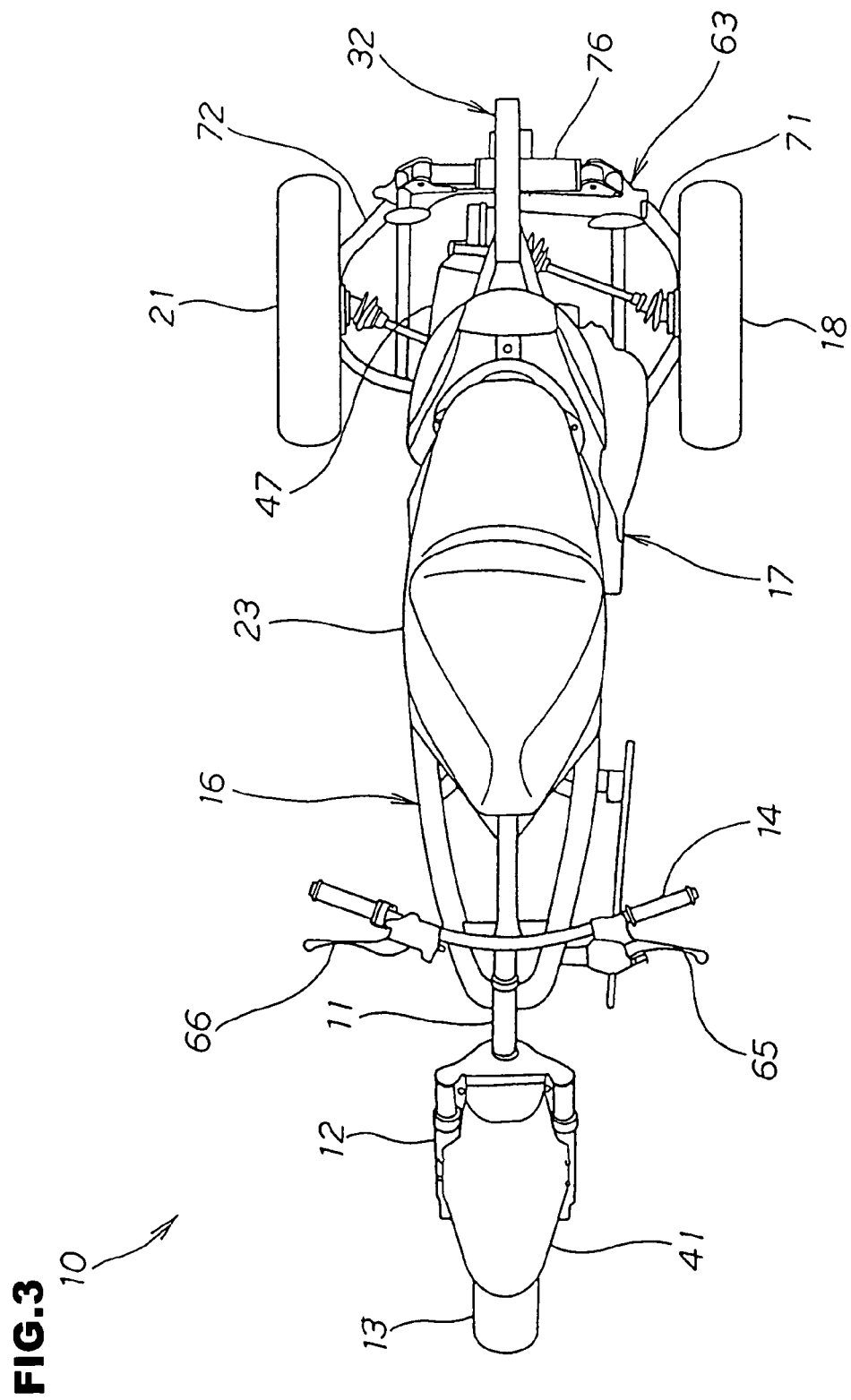
FIG. 3 is a plan view of a three-wheeled vehicle of the present invention.

FIG. 3 is a plan view of a three-wheeled vehicle of the present invention, showing that the rear section of the J frame 32 is constructed by a single pipe, this J frame 32 being attached to a rear suspension 63 (the detail will be described later). Here, numeral 65 is a rear wheel brake lever and numeral 66 is a front wheel brake lever.

Figure 4:
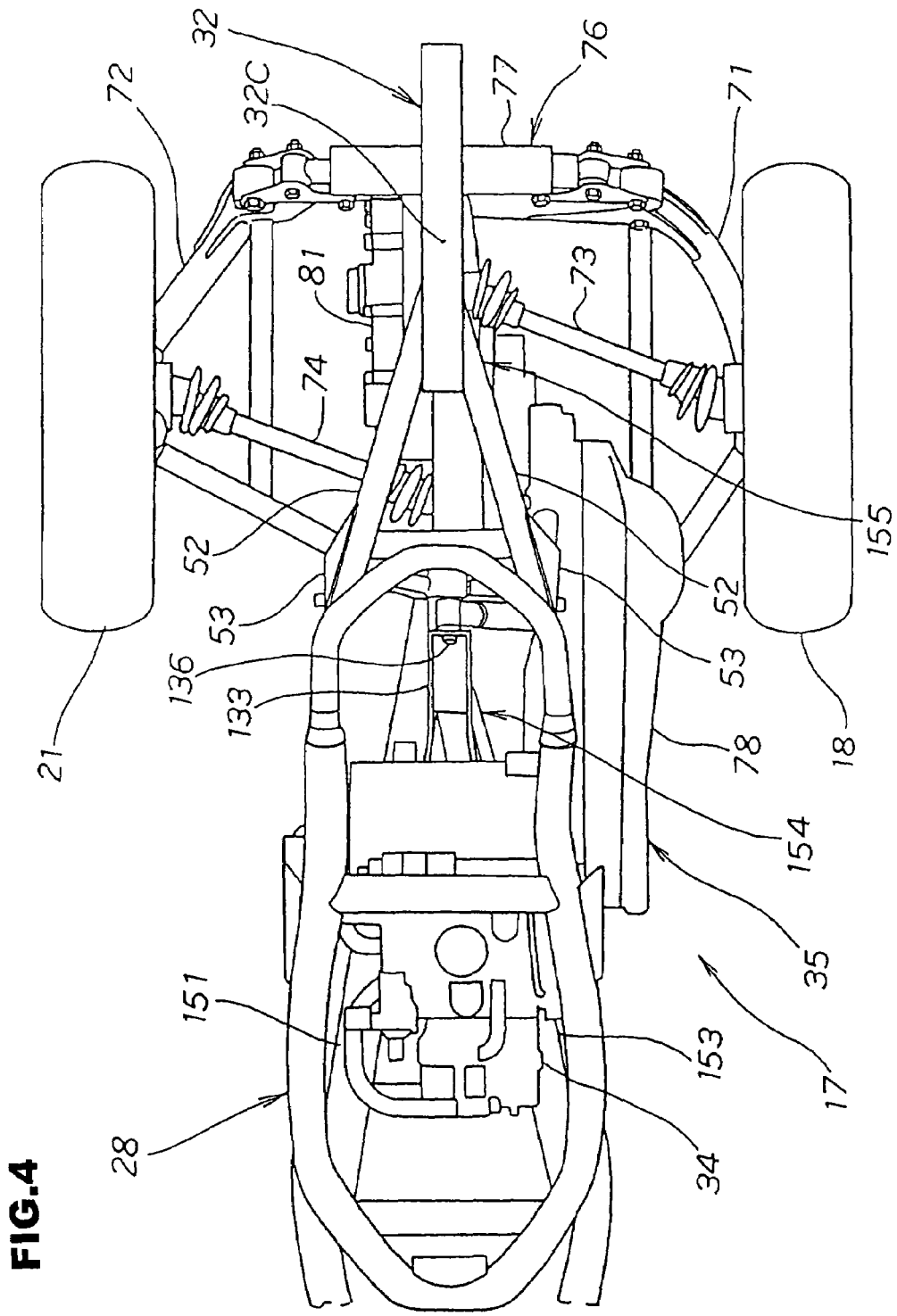
FIG. 4 is a plan view of essential parts of a three-wheeled vehicle of the present invention.

FIG. 4 is a plan view of essential parts of a three-wheeled vehicle of the present invention, showing a structure where suspension arms 71, 72 are attached to the left and right of the J frame 32, the front ends of the suspension arms 71, 72 are respectively attached to a holder (not shown), the holders are respectively attached with rear wheels 18, 21 in a rotatable manner, and the rear wheels 18, 21 are driven by drive shafts 73, 74 constituting a power transmission mechanism 35 for the power unit 17.

Numeral 76 is a shock absorber as an elastic means comprising a damper 77 and a compression coil spring (not shown), and being linked to both of the left and right suspension arms 71, 72.

The center upper frame 28 is a substantially oval member, and with a storage box 22 having substantially the same shape base (refer to FIG. 1) is attached to an upper section of the center upper frame 28. The power transmission mechanism 35 for the power unit 17 comprises a belt-type infinitely variable transmission 78 extending rearwards from the left rear section of the engine 34, a gear box 81 linked to the rear section of this infinitely variable transmission 78, a drive shaft 74 connecting to the output shaft of the front side of the gear box 81, and a drive shaft 73 connecting to the output shaft of the rear side of the gear box 81.

Figure 5:
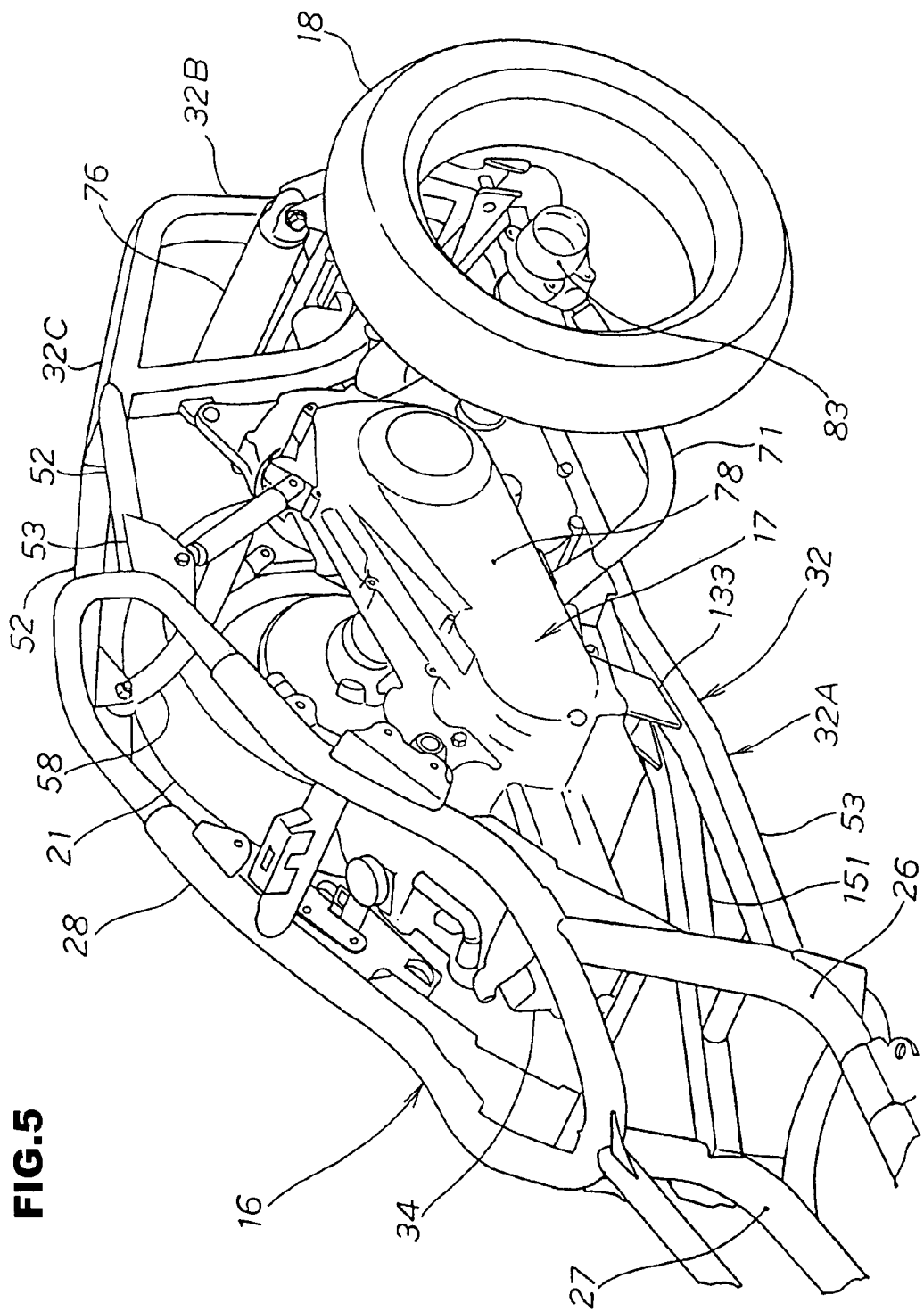
FIG. 5 is a first perspective view of a three-wheeled vehicle of the present invention.

FIG. 5 is a first perspective view of a three-wheeled vehicle of the present invention, showing that the rear sections of the lower pipes 26, 27 of the vehicle frame 16 are attached to the front section of the J frame 32. Here, numeral 83 is a holder (the holder 83 for the inner side is not shown).

Figure 6:
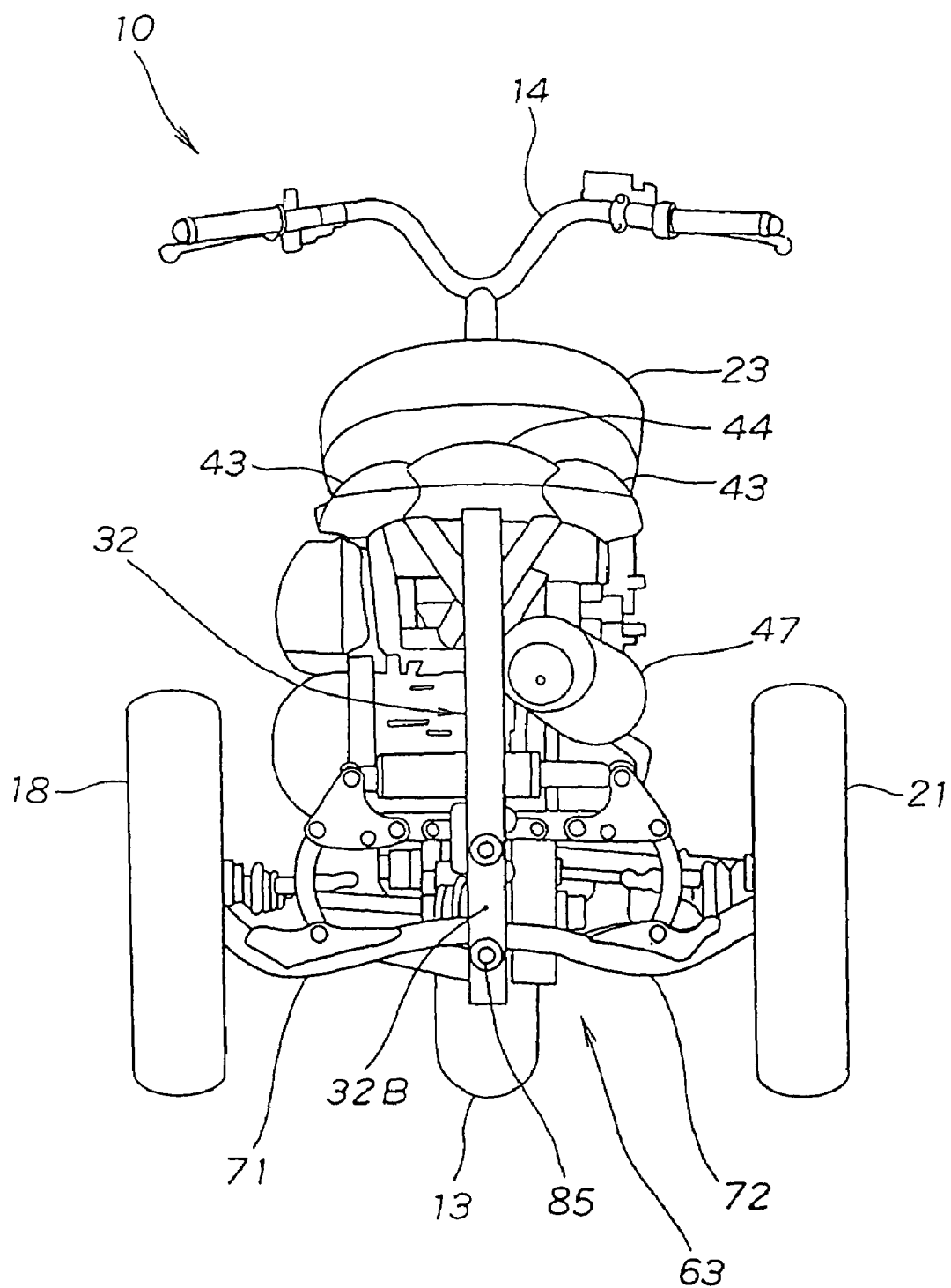
FIG. 6 is a rear view of a three-wheeled vehicle of the present invention.

FIG. 6 is a rear view of a three-wheeled vehicle of the present invention, showing that the rear end inclined part 32B of the J frame 32 is a part being substantially vertical in the state where a three-wheeled vehicle 10 is not boarded, and this rear end inclined part 32B is attached with the rear section of the suspension arms 71, 72. Here, numeral 85 is a rear swing shaft for attaching the rear sections of the suspension arms 71, 72 to the rear end inclined part 32B in a swingable manner.

Figure 7:
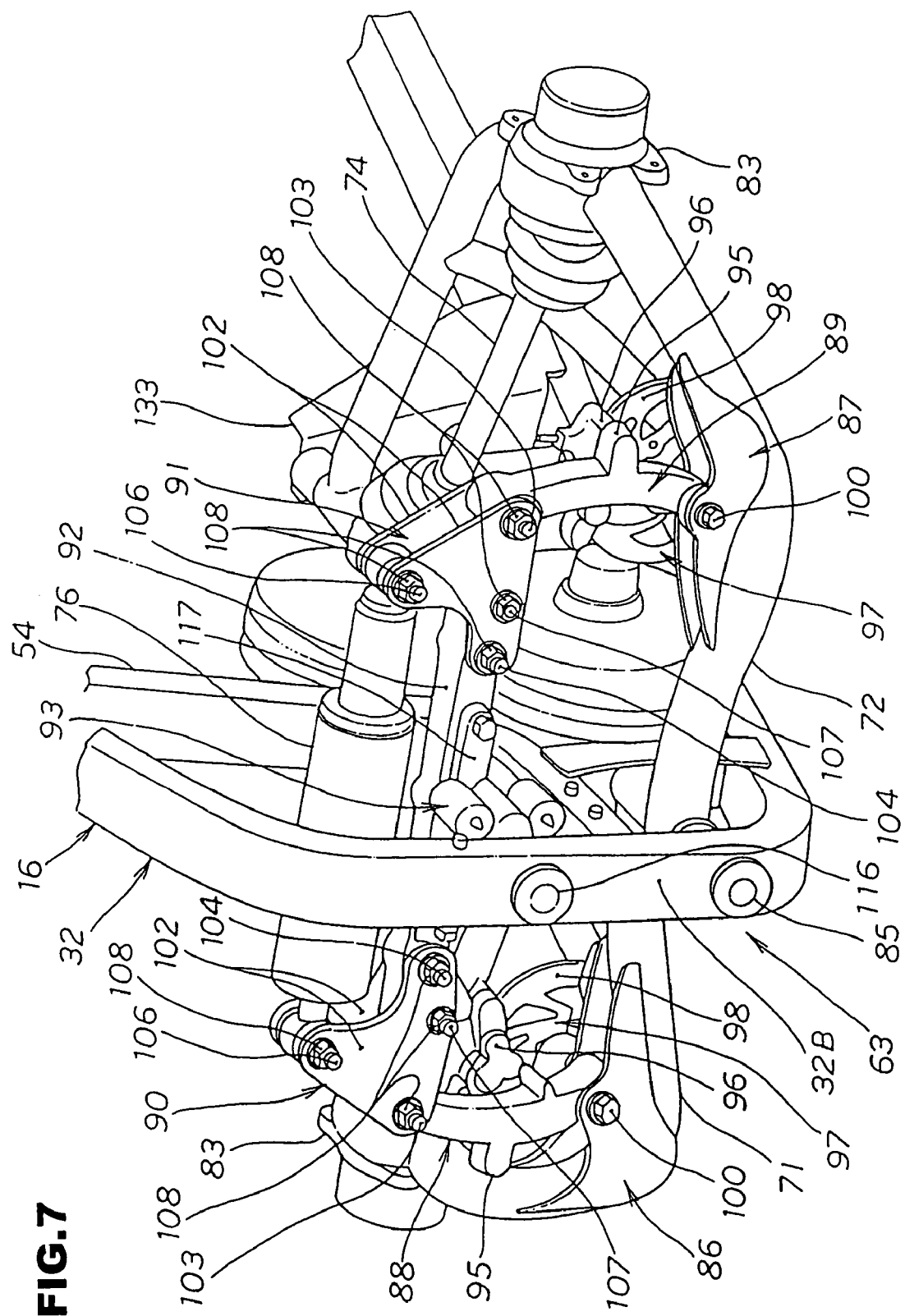
FIG. 7 is a second perspective view of a three-wheeled vehicle of the present invention.

FIG. 7 is a second perspective view of a three-wheeled vehicle of the present invention, showing a rear suspension 63 where the suspension arms 71, 72 are extended to left and right from the J frame 32, each front end of the suspension arms 71, 72 being attached to a holder 83, the upper sections of the suspension arms 71, 72 being attached respectively to circular arc shaped links 88, 89 in a swingable manner via mounting brackets 86, 87, the ends of the circular arc shaped links 88, 89 being attached with bell cranks 90, 91 having a substantially L shape when viewed from the side in a swingable manner. A shock absorber 76 spans across the upper end parts of bell cranks 90, 91, a bar shaped connecting member 92 spans across the side end parts of the bell cranks 90, 91, and the connecting member 92 is attached to the rear end inclined part 32B of the J frame 32 via the swing mechanism 93.

Each of the circular arc shaped links 88, 89 is a member having a side projection 95 at the central part with brake calipers 96, 96 attached on the side projections 95 thereof for braking the swinging of the circular arc shaped links 88, 89. Numeral 97, 97 is a braking device equipped with a brake caliper 96, sandwiching disks 98, 98 using the brake calipers 96, 96 by hydraulic pressure. The disks 98, 98 are members attached to the suspension arms 71, 72 respectively. Numeral 100 is a bolt being a swing shaft for the circular arc shaped links 88; 89.

Each of bell cranks 90, 91 comprise two crank plates 102,102 and are provided with a first bolt 103, a second bolt 104 and third bolt 106.Here, numeral 107 is a fourth bolt that is a stopper pin for controlling expansion of the shock absorber 76, and numerals 108 are nuts to be screwed onto a first bolt 103 to a fourth bolt 107.

The swing mechanism 93 is a mechanism permitting the vehicle frame 16 to swing left and right with respect to the suspension arms 71, 72 when cornering, and as the inclination of swing becomes more severe, the swing mechanism 93 makes the vehicle frame 16 return to the original position by making the reaction force larger using a built-in resilient body.

Figure 8A:
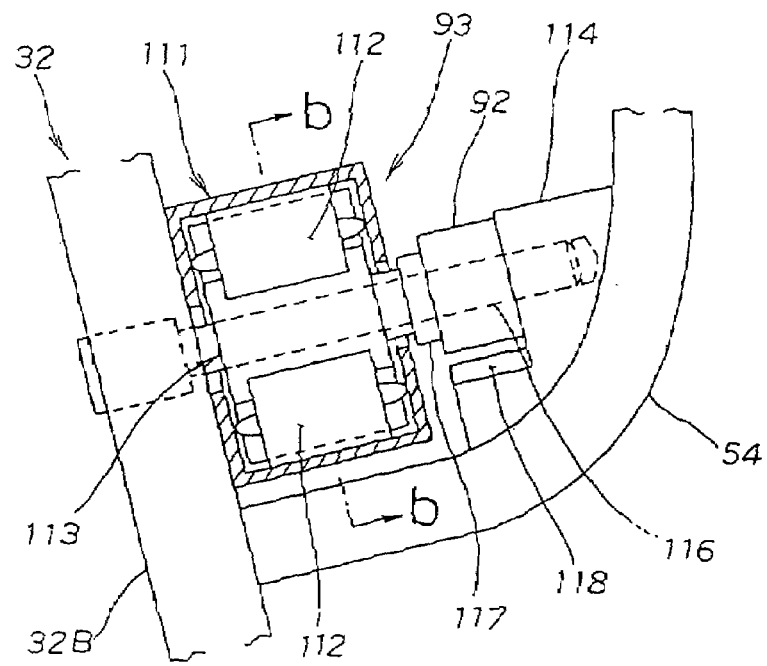
FIGS. 8A–C are explanatory drawings of a swing mechanism of the present invention.
Figure 8B:
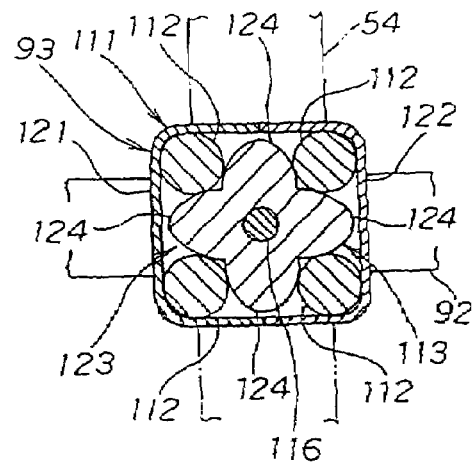
Figure 8C:
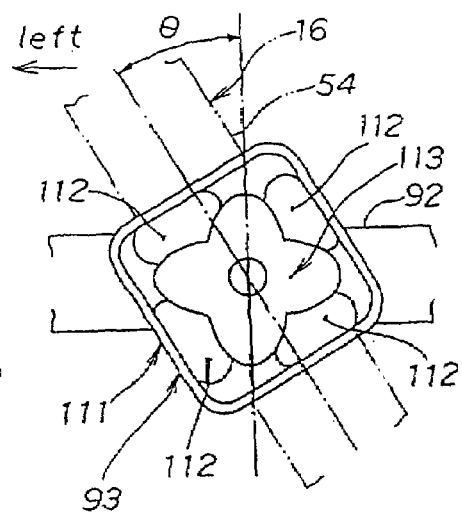

FIGS. 8(a) to 8(c) are explanatory drawings of a swing mechanism of the present invention, 8(a) being a side view (a partial cross section), (b) being a cross-sectional view along line b—b of FIG. 8(b) and 8(c) being an explanatory drawing based on FIG. 8(b). In FIG. 8 (a), the swing mechanism 93 comprises a case 111 attached to the rear end inclined part 32B of the J frame 32 and the rear section of the L pipe 54, damper rubbers 112 housed in the case 111, a pressing member 113 pressing the damper rubbers 112 and being attached to the connecting member 92, and a penetrating pin 116 permitting the pressing member 113 and the connecting member 92 to penetrate and being supported by the rear end inclined part 32B and an end support section 114 of which both end parts are provided on the L pipe 54, i.e. "Neidhart damper". Here, numeral 117 is a fitting part provided at the pressing member 113 for fitting the pressing member 113 to the connecting member 92 using a bolt, and numeral 118 is a swing controller integrally provided at the end support section 114 for controlling swing amount of the connecting member 92.

In FIG. 8 (b), the case 111 is a member combining a left case 121 and a right case 122, and having a damper storage chamber 123 inside, damper rubbers 112 are arranged in the four corners of this damper storage chamber 123, and the damper rubbers 112 are pressed by projection-shaped pressing parts 124 of the pressing member 113.

In FIG. 8 (c), the vehicle frame 16 swings to the left (the arrow "left" in the drawing shows the left side direction of the vehicle) of the vehicle with respect to the connecting member 92 coupled to the suspension arm side, and the case 111 of the swing mechanism 93 rotates relatively with respect to the pressing member 113 if the L pipe 54 inclines by angle θ, the damper rubbers 112 housed within the case 111 are sandwiched between the case 111 and the pressing member 113 and compressed, and a reaction force is generated to return not only the case 111 but also the vehicle frame 16 to the original position (position (a)).

Figure 9:
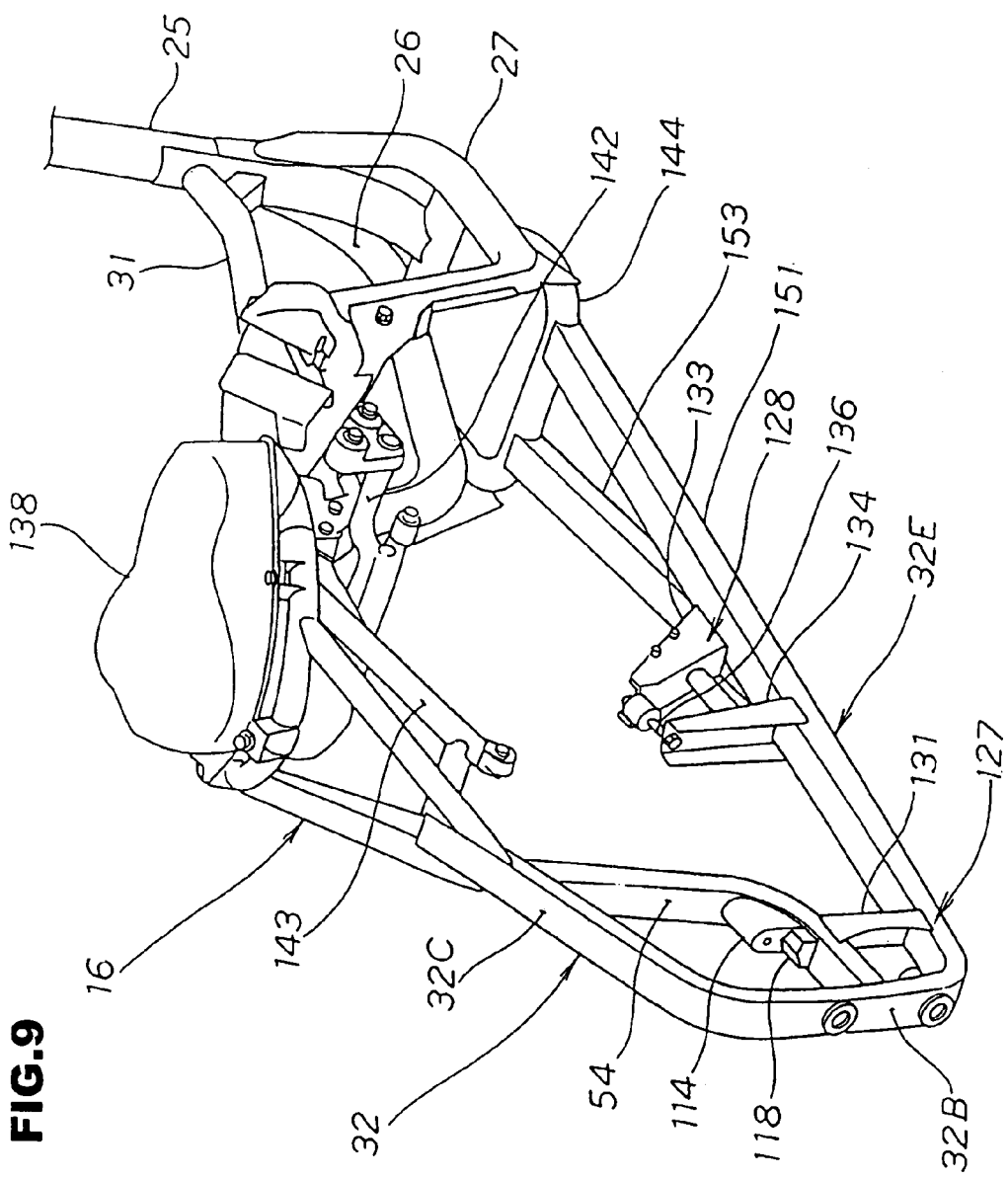
FIG. 9 is a third perspective view of a three-wheeled vehicle of the present invention.

FIG. 9 is a third perspective view (the vehicle frame viewed obliquely from behind) of a three-wheeled vehicle of the present invention, showing that the J frame 32 is provided with a rear fitting part 127 for fitting the rear sections of the suspension arms 71, 72 so as to be capable of swinging (refer to FIG. 7) and a front fitting part 128 for fitting the front sections of the suspension arms 71, 72.

The rear fitting part 127 comprises a rear end inclined part 32B and a vertical bracket 131 stretched from the L pipe 54 down to a lower horizontal part 32E (will be described later), and the rear end inclined part 32B and the vertical bracket 131 are respectively attached with the rear swing shaft (refer to FIG. 6) supporting the rear sections of the suspension arms 71, 72.

The front fitting part 128 comprises a front erected part 133 and a rear erected part 134 both being erected and spaced on the lower horizontal part 32E, and the front erected part 133 and the rear erected part 134 are respectively attached with a front swing shaft 136 supporting the suspension arms 71, 72.

Here, numeral 138 is a fuel tank, 142, 143 are engine mounting vibration preventing links for mounting the engine 34 on the vehicle frame 16, and 144 is an U pipe having an U-shape attached to the rear lower section of the lower pipes 26, 27 in order to attach the end of the lower horizontal part 32E of the J frame 32.

In FIG. 5, an embodiment is shown where the front end of the lower horizontal part 32A branched into a Y shape is directly attached to the lower pipes 26, 27. However, in FIG. 9, another embodiment is shown where the J frame 32 consists of a lower horizontal part 32E branched into a Y shape, a rear end inclined part 32B and an upper inclined part 32C, with the front end of the lower horizontal part 32E being attached via a U pipe 144 to the lower pipes 26, 27.

Figure 10:
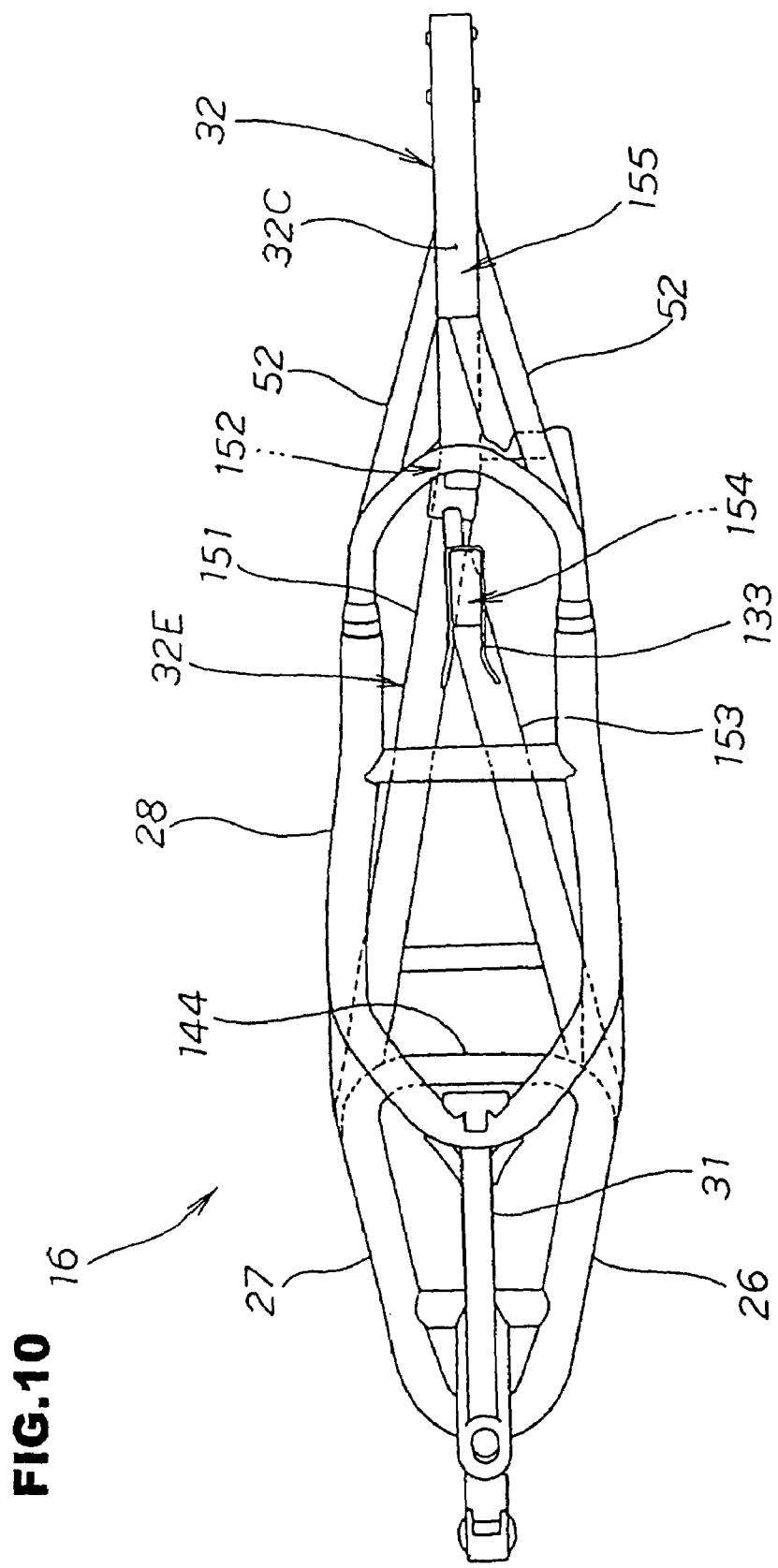
FIG. 10 is a plan view of a vehicle body frame of the present invention.

FIG. 10 is a plan view of a vehicle frame of the present invention, showing that the lower horizontal part 32E of the J frame 32 is branched in the middle into a Y shape to be linked to the rear section of the U pipe 144, and linking pipes 52, 52 are extended from the upper inclined part 32C of the J frame 32 to the center upper frame 28 in a Y shape.

The lower horizontal part 32E (and the lower horizontal part 32A (refer to FIG. 5)) are, specifically, portions formed by bending a single elongated first pipe 151 in the middle, and connecting a second pipe 153 to the vicinity of a bending part 152 of the first pipe 151. Here, numeral 154 is a Y-shaped branch connection formed by connecting the second pipe 153 to the first pipe 151 to branch into a Y shape, and numeral 155 is a Y-shaped branch connection formed by connecting the linking pipes 52, 52 to the upper inclined part 32C to branch into a Y shape. The first pipe 151 is a member including the rear end inclined part 32B and the upper inclined part 32C with the second pipe 153 removed from the J frame 32.

In this way, the coupling of the lower front section of the J frame 32 and the U pipe 144 can be made strong by forming the lower horizontal part 32E in a Y shape, and the coupling of the rear upper section of the J frame 32 can be made strong by arranging the linking pipes 52, 52 in a Y-shape manner. Also in FIG. 5, it is possible to make the coupling of the lower front section of the J frame 32 and the lower pipes 26, 27 strong by forming the lower horizontal part 32A in a Y shape.

Figure 11:
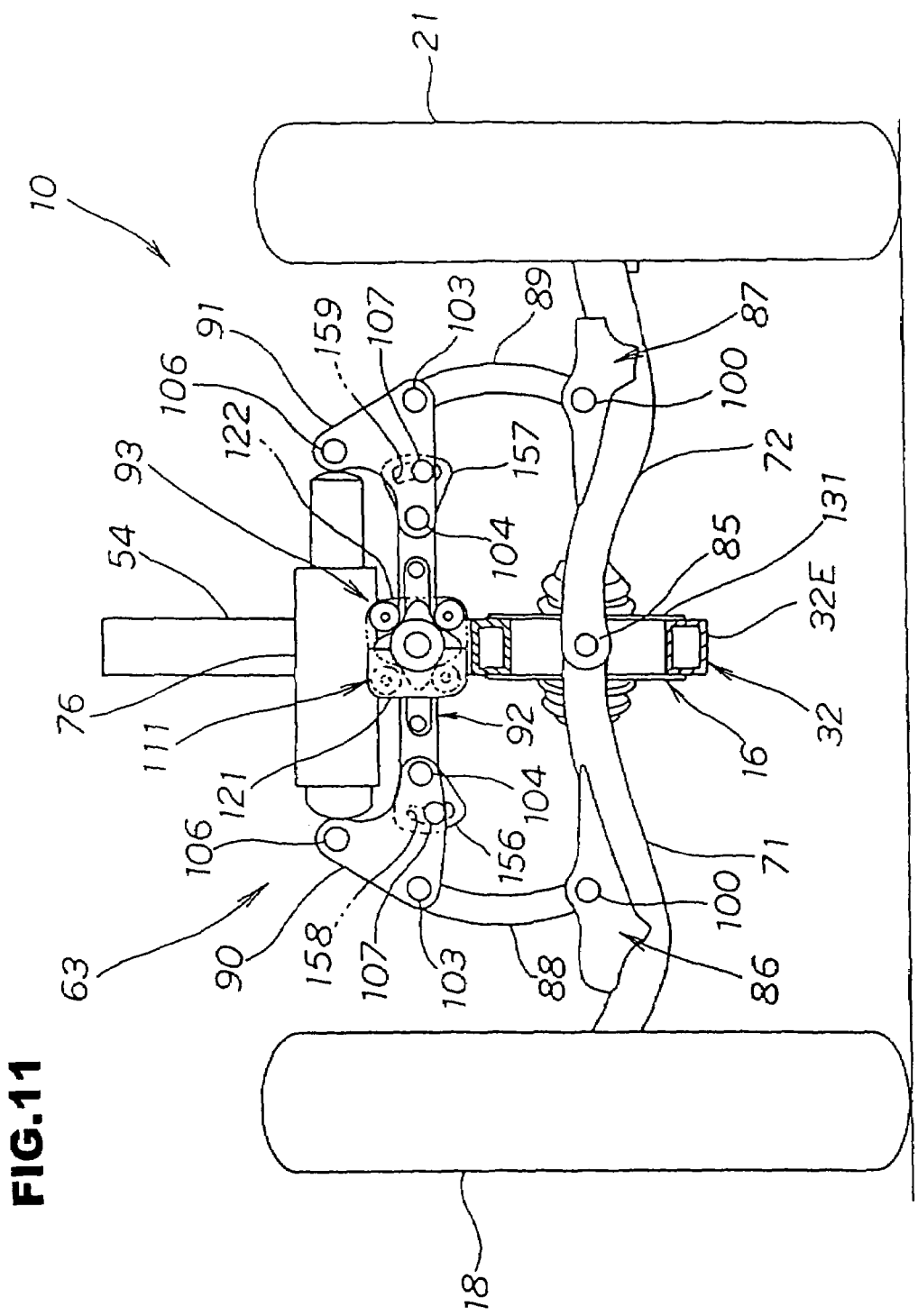
FIG. 11 is a rear view of a rear suspension of the present invention.

FIG. 11 is a rear view of a rear suspension of the present invention, showing a rear suspension 63 in a state where a single passenger (rider) is boarding (hereinafter this state is referred to as the "1G state"). The rear end inclined part 32B and the upper inclined part 32C of the J frame 32 shown in FIG. 9 are omitted. The right case 122 of the swing mechanism 93 in FIG. 8(b) is shown by an imaginary line. At this time, the L pipe 54 of the vehicle frame 16 is in a vertical state and the connecting member 92 is in a substantially horizontal state.

The connecting member 92 is a member provided with fan-shaped sections 156, 157 on both its ends, and the fan-shaped sections 156, 157 are provided with elongated holes having an arc shape 158, 159, respectively. The inclination angle of bell cranks 90, 91 with respect to the connecting member 92 is controlled by having fourth bolts 107, 107 as stopper pins to go through the elongated holes having an arc shape 158, 159. The inclination angle of the bell cranks 90, 91 varies depending on the inclination angle of the suspension arms 71, 72, i.e. the vertical movement amount of the rear wheels 18, 21. In other word, the elongated holes having an arc shape 158, 159 are portions to control the vertical movement amount of the rear wheels 18, 21.

Figure 12:
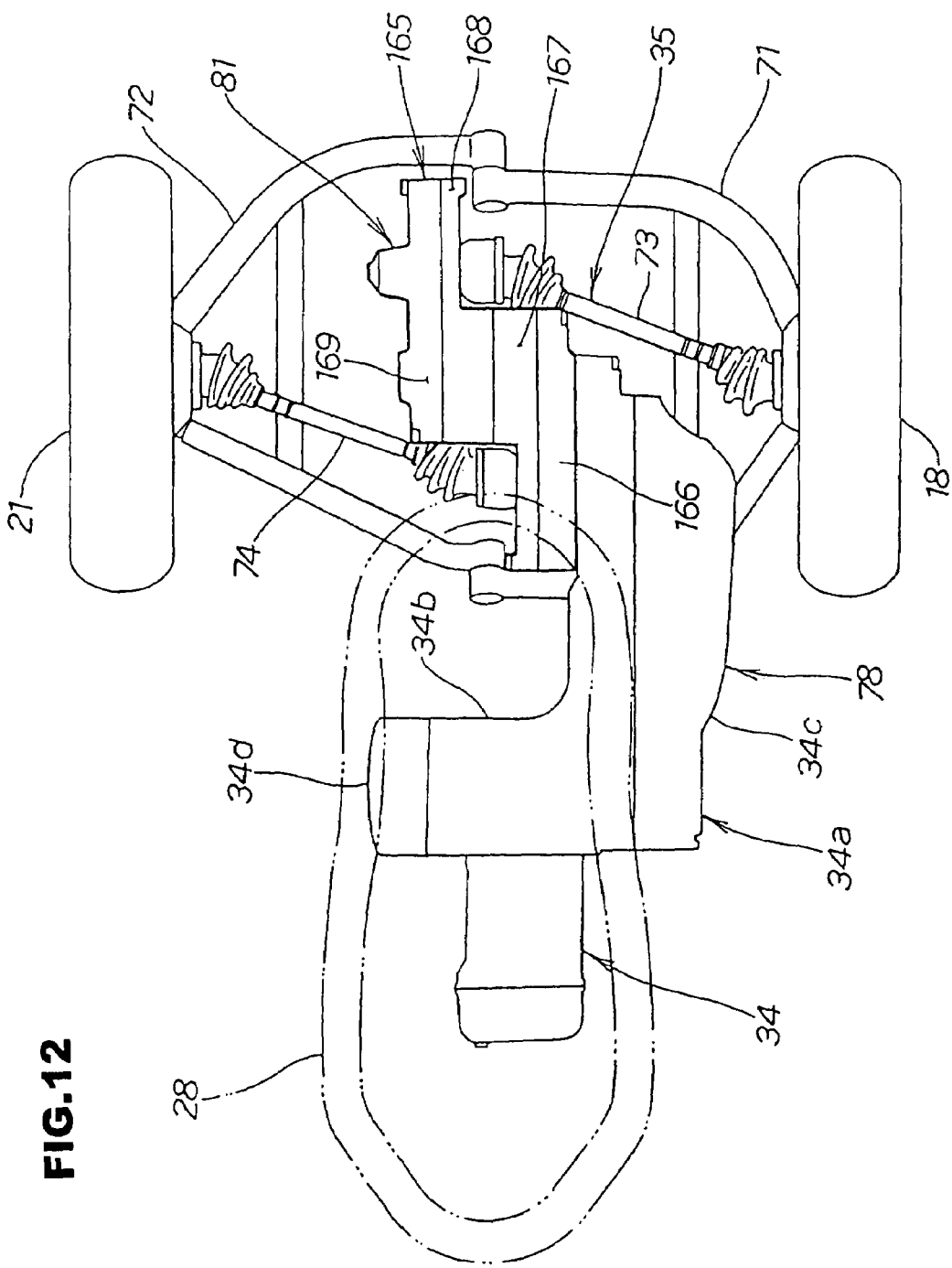
FIG. 12 is a plan view of essential parts of a power transmission mechanism of the present invention.

FIG. 12 is a plan view of essential parts of a power transmission mechanism 35 of the present invention, showing an infinitely variable transmission 78 stored in the rear section of a crank case 34a of an engine 34, and the rear section of the crank case 34a being attached with a gear box 81 separated from a crank case 34a.

The crank case 34a consists of a case body 34b, a transmission cover 34c covering the left side of the case body 34b and a right cover 34d covering the right side of the case body 34b. The gear box 81 has a gear case 165 for storing a plurality of gears and the gear case 165 comprises a first case 166 to a fourth case 169.

Figure 13:
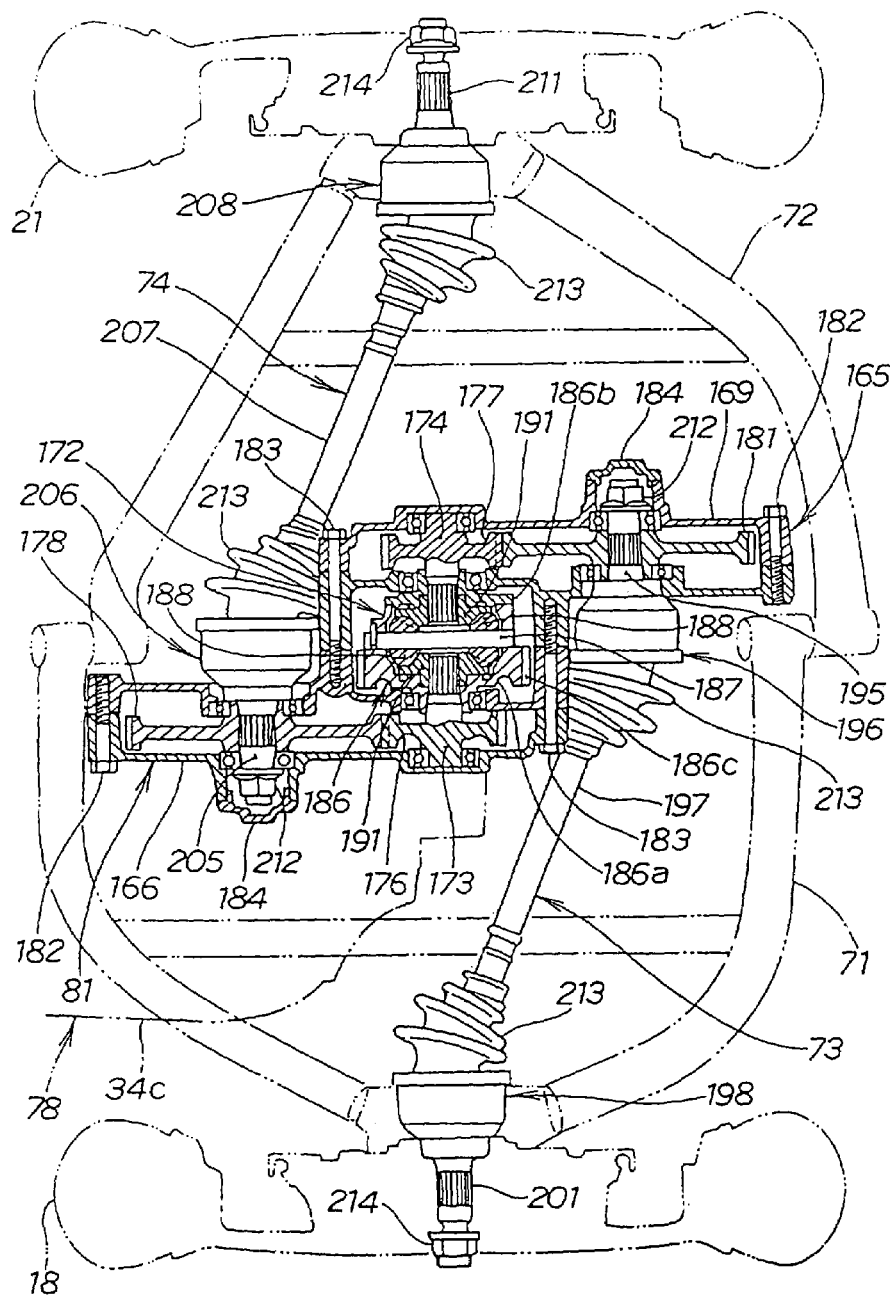
FIG. 13 is a cross-sectional view showing a gear box of the present invention.

FIG. 13 is a cross-sectional view describing a gear box of the present invention, and a gear box 81 comprises a differential mechanism 172, a first left gear 176 and a first right gear 177 respectively integrally formed on a left differential shaft 173 and a right differential shaft 174 being an output of the differential mechanism 172, a second left gear 178 and a second right gear 181 respectively meshed with the first left gear 176 and the first right gear 177 and bolts 182, 183 coupling the gear case 165, a plurality of bearings and each case of the gear case. Numeral 184, 184 are caps for covering a first case 166 and a fourth case 169.

The differential mechanism 172 comprises a case 186, a pin 187 attached to the case 186, a pair of first bevel gears 188, 188 rotatably attached to the pin 187, a pair of second bevel gears 191, 191 meshed with the first bevel gears 188, 188, and the aforementioned left differential shaft 173 and right differential shaft 174 spline-fitted to the second bevel gears 191, 191.

The case 186 comprises a case body 186a and a cover 186b covering the case body 186a, the case body 186a being provided with a large diameter gear 186c for obtaining power from the infinitely variable transmission 78 side, and the case 186 stores the first bevel gears 188, 188 and the second bevel gears 191, 191.

A drive shaft 73 comprises an inner shaft 195 spline-fitted to the second right gear 181, a center shaft 197 coupled with the inner shaft 195 via a constant velocity joint 196 and an outer shaft 201 linked to the end of the center shaft 197 via a constant velocity joint 198 and spline-fitted to a hub of the rear wheel 18 side.

The drive shaft 74 comprises an inner shaft 205 spline-fitted to the second left gear 178, a center shaft 207 linked to the inner shaft 205 via a constant velocity joint 206 and an outer shaft 211 linked to the end of the center shaft 207 via a constant velocity joint 208 and spline-fitted to a hub of the rear wheel 21 side. Numeral 212, 212 is a nut for fixing the inner shafts 195, 205 respectively to the second left gear 178 and the second right gear 181, numeral 213 is a rubber boot for covering the constant velocity joints 196, 198, 206, 208, and numeral 214 is a nut for fixing the outer shafts 201, 211 to a hub.

The inner shaft 195 of the drive shaft 73 is a left output shaft of the gear box 81 and the inner shaft 205 of the drive shaft 74 is a right output shaft of the gear box 81. In this way, in the present invention, the inner shafts 195, 205 as left and right output shafts of the gear box 81 are provided being spaced apart in a longitudinal direction of the vehicle.

Figure 14:
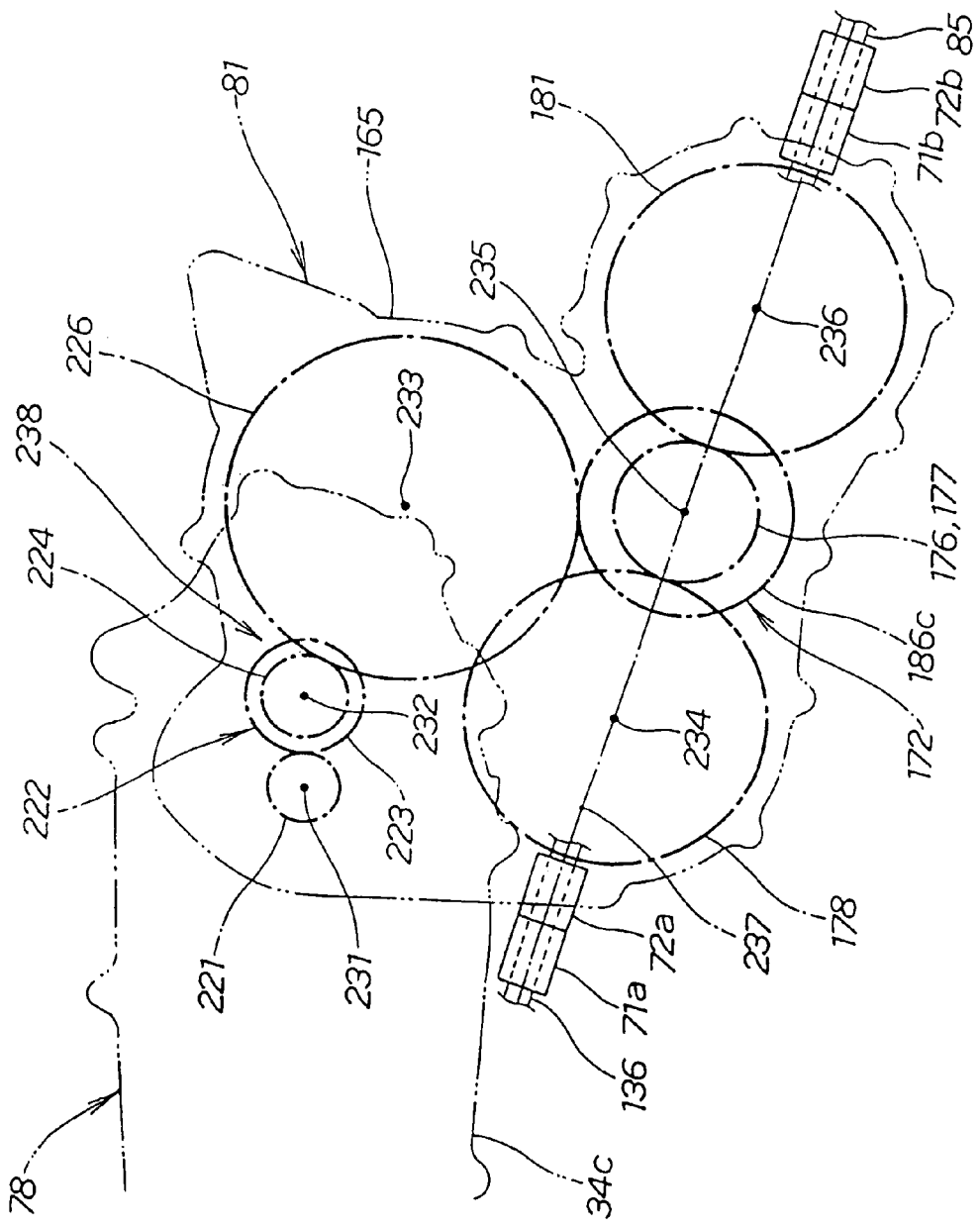
FIG. 14 is a side view showing a gear train of a gear box of the present invention.

FIG. 14 is a side view of a gear train of a gear box of the present invention, showing that a drive gear 221 is attached to the shaft of a driven side movable pulley of a belt-type infinitely variable transmission 78, a large gear 223 constituting a reduction gear 222 is meshed with the drive gear 221, a small gear 224 integrally formed on the large gear 223 is meshed with a transmission gear 226, a large gear 186c of a differential mechanism 172 is meshed with the transmission gear 226, a first left gear 176 of a left differential shaft 173 (refer to FIG. 13) having the axial center overlapping with that of the large gear 186c is meshed with a second left gear 178, a first right gear 177 of a right differential shaft 174 (refer to FIG. 13) having the axial center overlapping with that of the large gear 186c is meshed with a second left gear 181, and the differential mechanism 172, specifically, the first left gear 176 and the first right gear 177, is arranged below the infinitely variable transmission 78. Numerals 231 to 236 are centers of rotation of each gear.

The drive gear 221, the reduction gear 222 and the transmission gear 226 are parts constituting a reduction mechanism 238. Namely, the gear box 81 comprises a differential mechanism 172 and a reduction mechanism 238.

Also, FIG. 14 shows that centers of rotation 234, 235, 236 are arranged on a line 237, a front swing shaft 136 and a rear swing shaft 85 are arranged on the line 237, each of front fitting parts 71a, 72a of suspension arms 71, 72 are rotatably fitted to the front swing shaft 136, and each of rear fitting parts 71b 72b of the suspension arms 71, 72 are rotatably fitted to the rear swing shaft 85. Namely, FIG. 14 shows that the front fitting parts 71a, 72a and the rear fitting parts 71b, 72b of the suspension arms 71, 72 are arranged to the front and rear of the differential mechanism 172.

Figure 15:
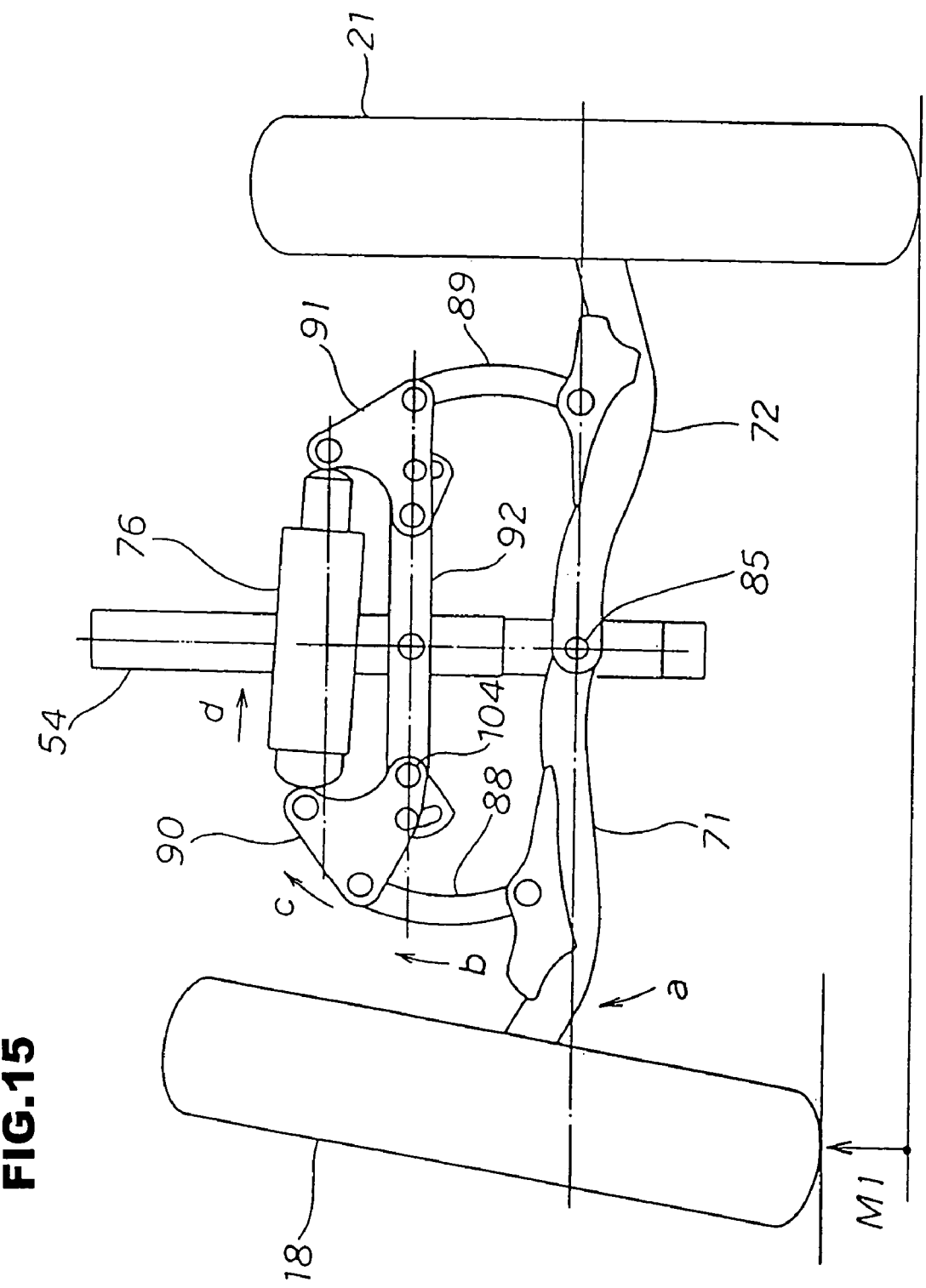
FIG. 15 is a first explanatory drawing for describing the operation of a rear suspension of the present invention.

The rear suspension of the invention enables the rear driving wheels to move independently with respect to each other in a vertical direction and with respect to the vehicle frame 16. The following is a description of the operation of the rear suspension 63 described above. FIG. 15 is a first explanatory drawing for describing the operation of a rear suspension of the present invention. For example, if the rear wheel 18 on the left side is moved upwards by movement amount M1 from the state shown in FIG. 11, a suspension arm 71 swings upwards as shown by the arrow a with a rear swing shaft 85 and a front swing shaft 136 (refer to FIG. 9) taken as a center. Accompanying this, a circular arc shaped link 88 goes up as shown by the arrow b to swing a bell crank 90 taking a second bolt 104 as a fulcrum in the direction of the arrow c and a shock absorber 76 is pressed and compressed as shown by the arrow d. By doing this, the transmission of impact to the vehicle frame 16 side (refer to FIG. 10) accompanying a rise of the rear wheel 18 on the left side is relieved. At this time, the other suspension arm 72 is in the same state as shown in FIG. 11, so that a connecting member 92 is at the same substantially horizontal state as shown in FIG. 11.

Figure 16:
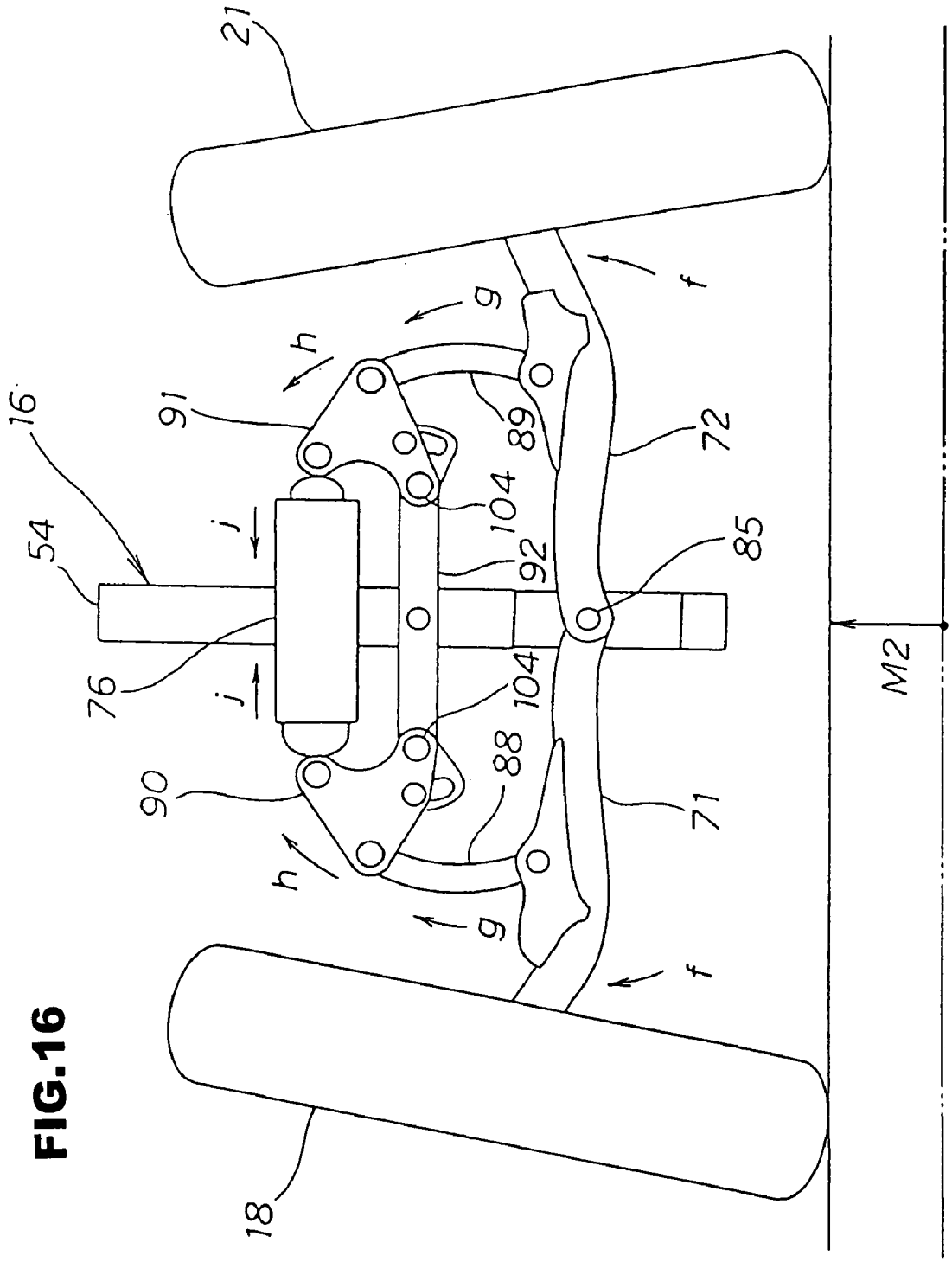
FIG. 16 is a second explanatory drawing for describing the operation of a rear suspension of the present invention.

FIG. 16 is a second explanatory drawing for describing the operation of a rear suspension of the present invention. When both of the rear wheels 18, 21 go up by movement amount M2 from the state shown in FIG. 11, or the vehicle frame 16 goes down by movement amount M2 with respect to the rear wheels 18, 21, the suspension arms 71, 72 swing upwards shown as the arrows f, f taking the rear swing shaft 85 and front swing shaft 136 (refer to FIG. 9) as a fulcrum. Accompanying this, the circular arc shaped links 88, 89 go up as shown by the arrows g, g to swing the bell cranks 90, 91 in the direction of the arrows h, h taking a second bolt 104 as a fulcrum and the shock absorber 76 is pressed and compressed in the direction of the arrows j, j. As a result of this, a buffering action is obtained due to the shock absorber 76.

Figure 17:
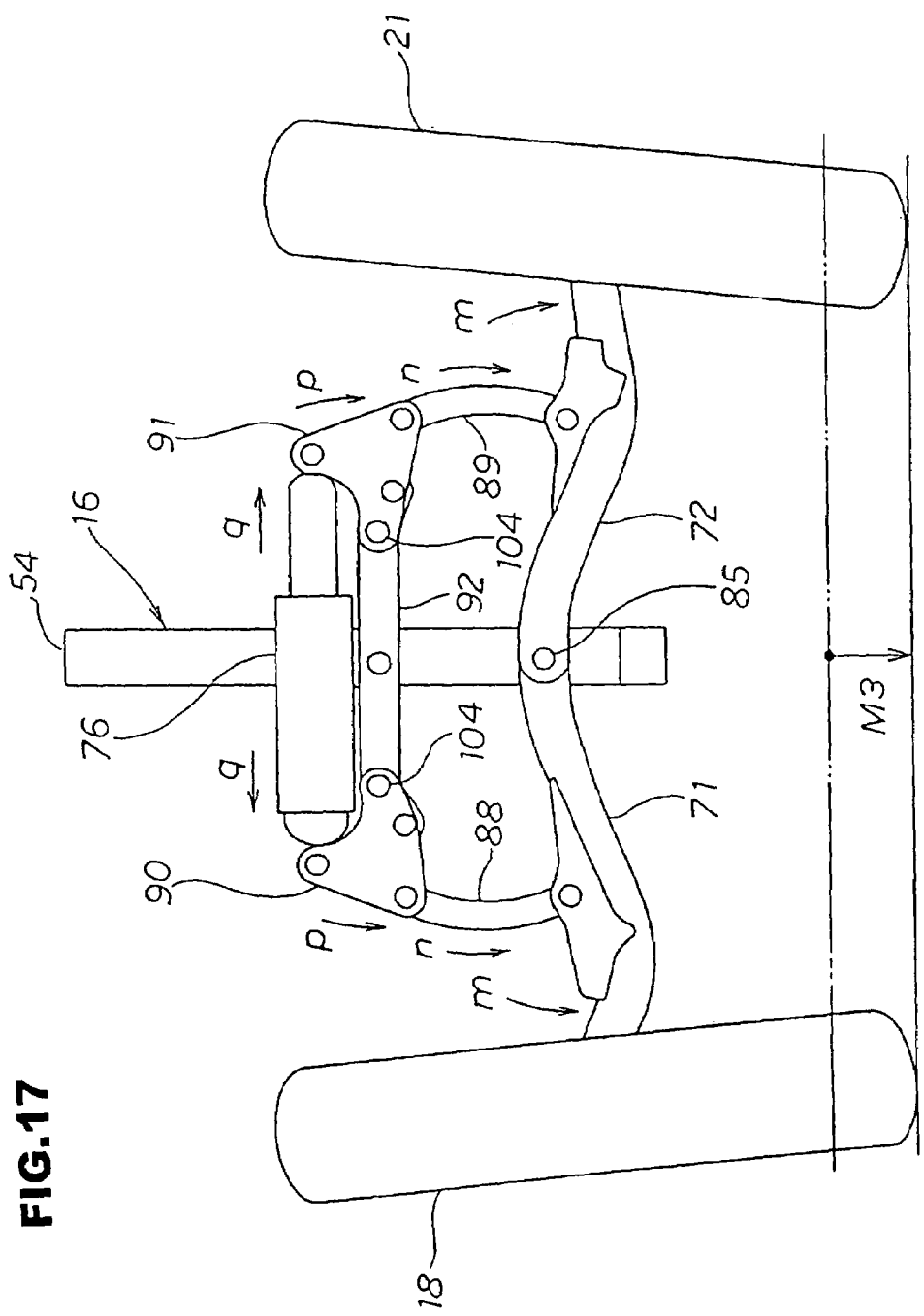
FIG. 17 is a third explanatory drawing for describing the operation of a rear suspension of the present invention.

FIG. 17 is a third explanatory drawing for describing the operation of a rear suspension of the present invention. When both of the rear wheels 18, 21 go down by movement amount M3 from the state shown in FIG. 11, or the vehicle frame 16 goes up by movement amount M3 with respect to the rear wheels 18, 21, the suspension arms 71, 72 swing downwards shown as the arrows m, m taking the rear swing shaft 85 and front swing shaft 136 (refer to FIG. 9) as a fulcrum. Accompanying this, the circular arc shaped links 88, 89 go down as shown by the arrows n, n to swing the bell cranks 90, 91 in the direction of the arrows p, p taking a second bolt 104 as a fulcrum and the shock absorber 76 is stretched in the direction of the arrows q, q. As a result of this, a buffering action is obtained due to the shock absorber 76.

Figure 18:
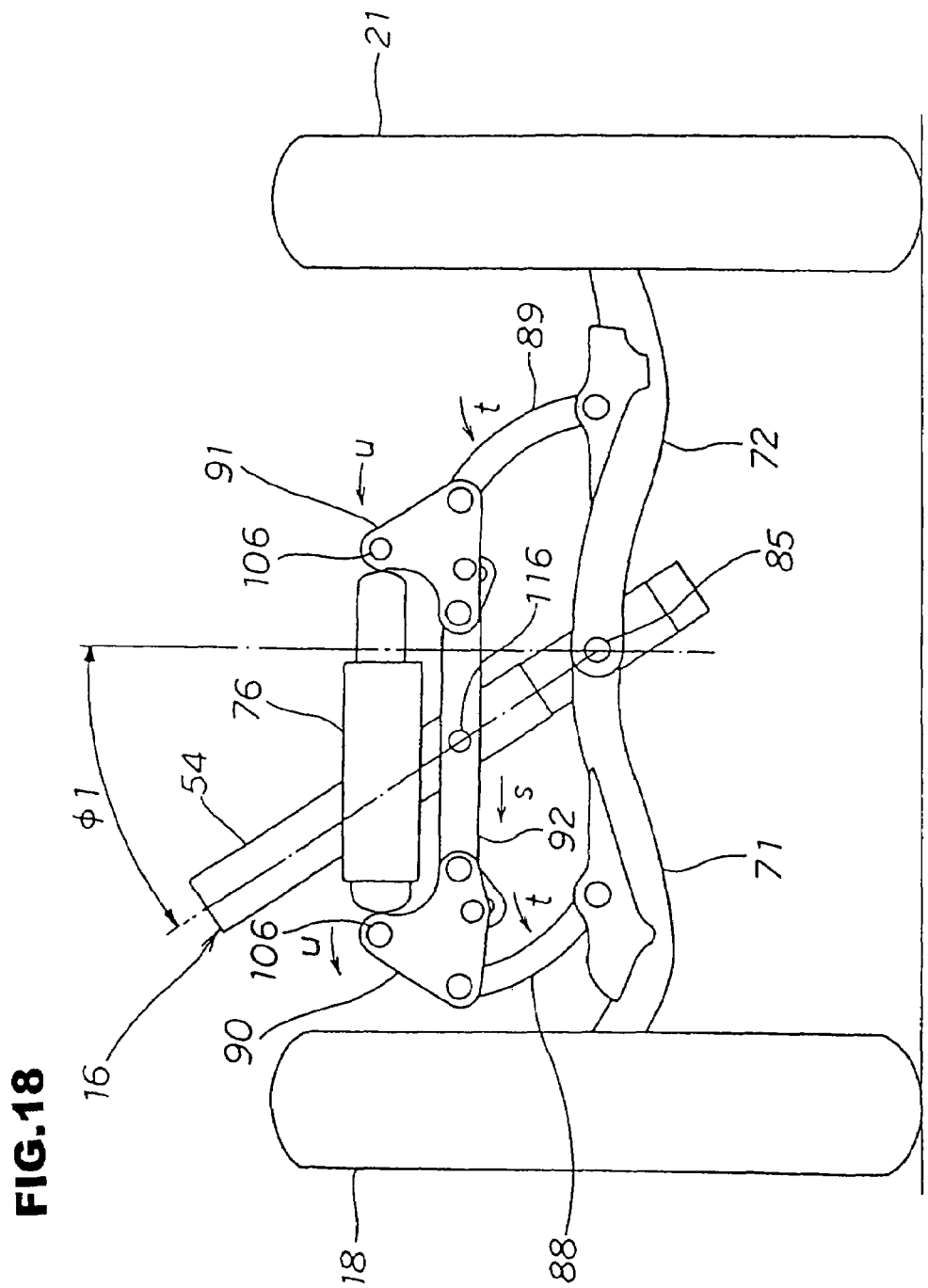
FIG. 18 is a fourth explanatory drawing for describing the operation of a rear suspension of the present invention.

FIG. 18 is a fourth explanatory drawing for describing the operation of a rear suspension of the present invention. If the vehicle frame 16, here, the L pipe 54, swings to the left side direction of the vehicle by angle $\phi1$ from the state shown in FIG. 11, the connecting member 92 coupled to the L pipe 54 using a penetrating pin 116 is moved in the left direction shown by the arrow s in a parallel manner. Accompanying this, the circular arc shaped links 88, 89 incline as shown by the arrows t, t and the bell cranks 90, 91 move in a parallel manner in the direction of the arrows u, u. A space between the third bolts 106, 106 of the bell cranks 90, 91 does not change, so that there is no expansion of the shock absorber 76.

At this time, since the vehicle frame 16 swings with respect to the connecting member 92, in a similar way shown in FIG. 8(c), a reaction force is generated due to the swing mechanism to return the vehicle frame 16 to the original position (namely, the position in FIG. 11).

Figure 19:
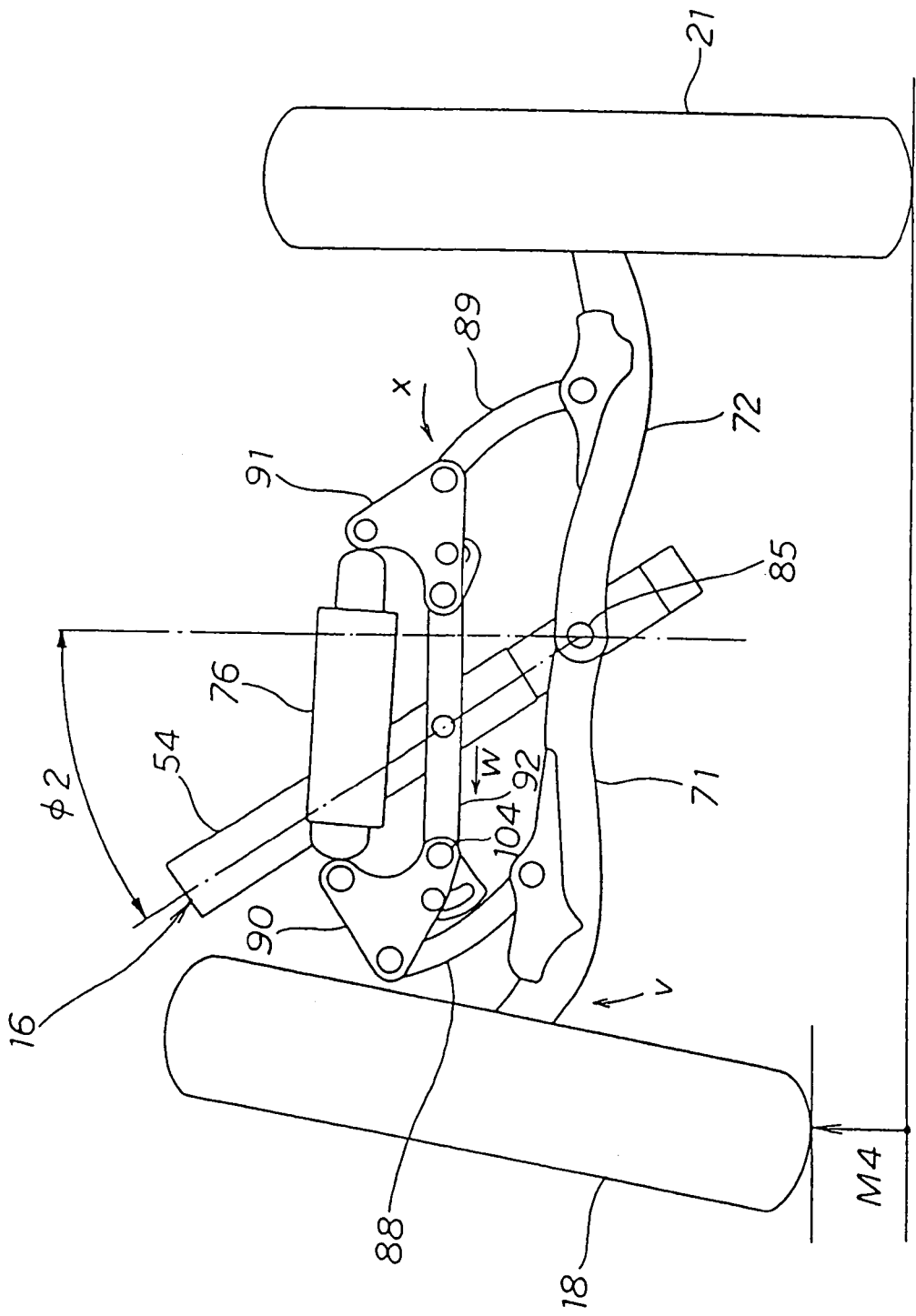
FIG. 19 is a fifth explanatory drawing for describing the operation of a rear suspension of the present invention.

FIG. 19 is a fifth explanatory drawing for describing the operation of a rear suspension of the present invention. If the rear wheel 18 goes up by movement amount M4, and the vehicle frame 16, here, the L pipe 54, swings to the left side direction of the vehicle by angle $\phi2$ from the state shown in FIG. 11, the suspension arm 71 swings upwards shown by the arrow v taking the rear swing shaft 85 and the front swing shaft 136 (refer to FIG. 9) as a fulcrum and the connecting member 92 moves to the left direction shown by the arrow w. Accompanying this, the circular arc shaped link 88 goes up and inclines to the left side, the circular arc shaped link 89 inclines to the left side as shown by the arrow x, and the bell crank 90 swings in the clockwise direction taking a second bolt 104 as a fulcrum and moves to the left side, which results in the shock absorber 76 being pressed and compressed to obtain a buffering action.

Figure 20A:
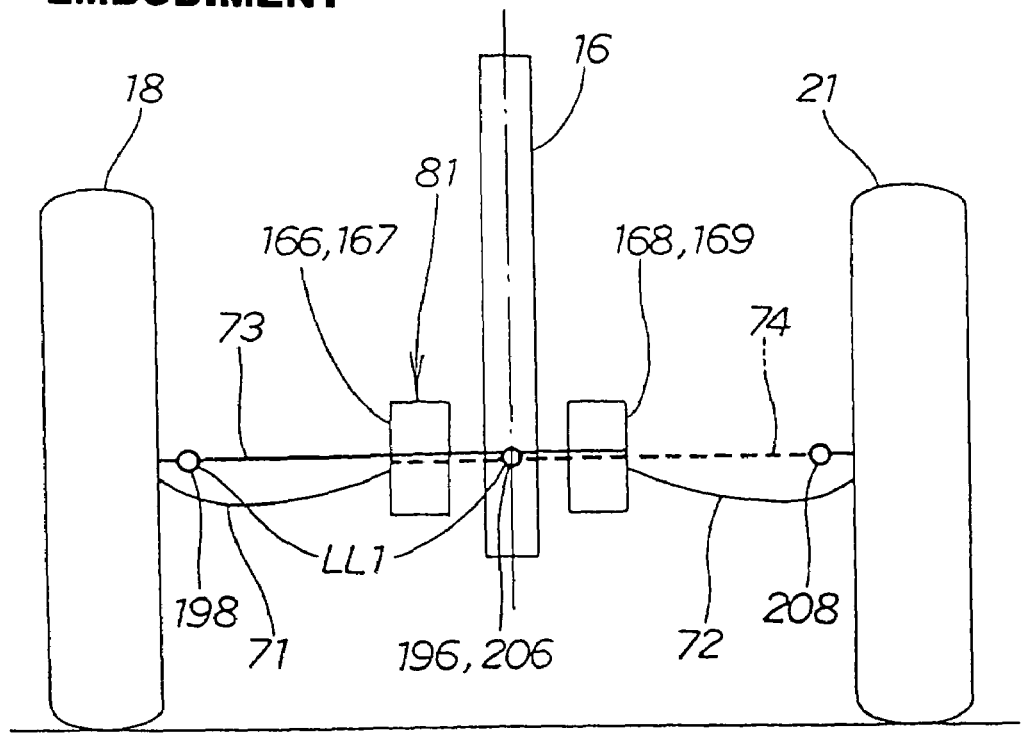
FIGS. 20A and 20B are rear views for comparing the overall lengths of drive shaft of an embodiment of the present invention and of a comparative example, respectively.
Figure 20B:
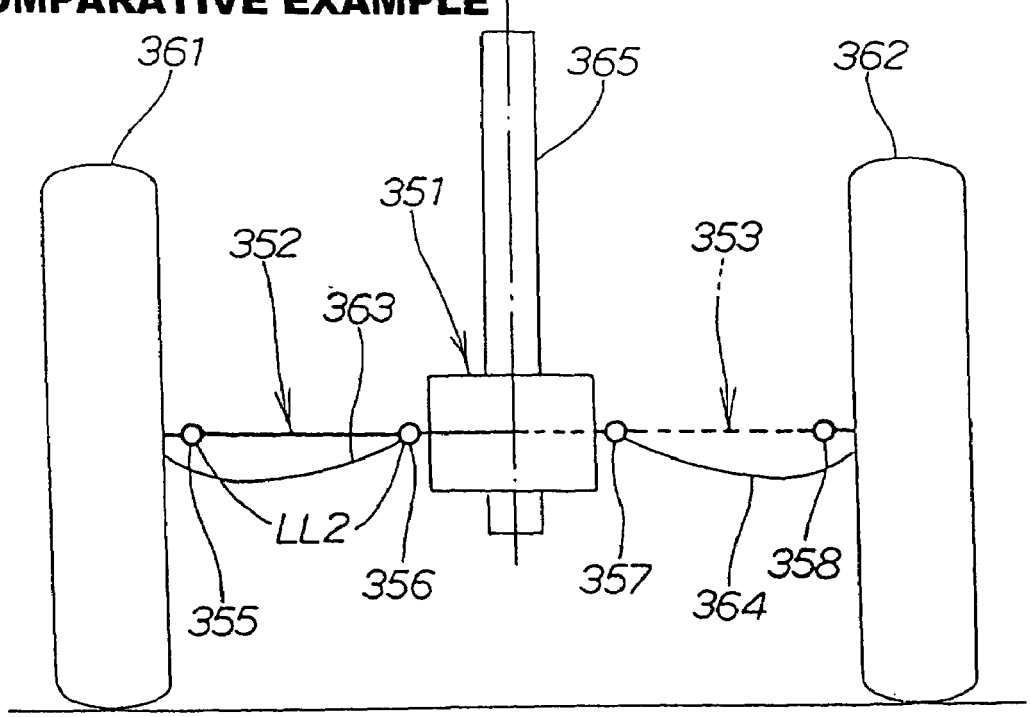

FIG. 20(a) and FIG. 20(b) are rear views for comparing the overall length of drive shafts, where FIG. 20(a) is an embodiment and FIG. 20(b) is a comparative example. In example (a), third and fourth cases 168, 169 provided on the right side of the gear box are attached with one end of a drive shaft 73, and first and second cases 166, 167 provided on the left side of the gear box 81 are attached with an end of the drive shaft 74. A symbol ○ in the drawing represents constant velocity joints 196, 198, 206, 208. Here, a distance LL1 between the constant velocity joints 196, 198 is taken as the overall length of the drive shaft 73.

In comparative example (b), an end of a left drive shaft 352 is attached to the left side of the gear box 351, and an end of a right drive shaft 353 is attached to the right side of the gear box 351. A symbol ○ in the drawing represents constant velocity joints 355, 356, 357, 358. Here, a distance LL2 between the constant velocity joints 355, 356 is taken as the overall length of the drive shaft 352. Numerals 361, 362 are rear wheels, and 363, 364 are suspension arms, and 365 is a vehicle frame. In the above (a) and (b), LL1>LL2.

Figure 21A:
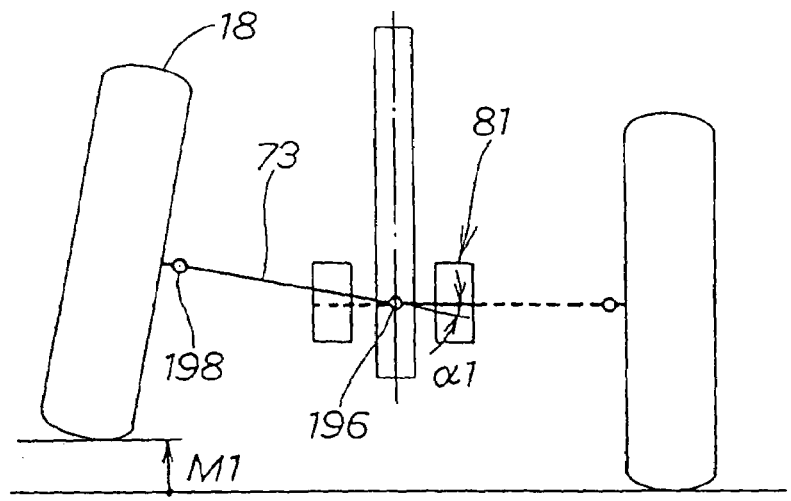
FIGS. 21A–C are explanatory drawings for describing the operation of a drive shaft of an embodiment of the present invention.
Figure 21B:
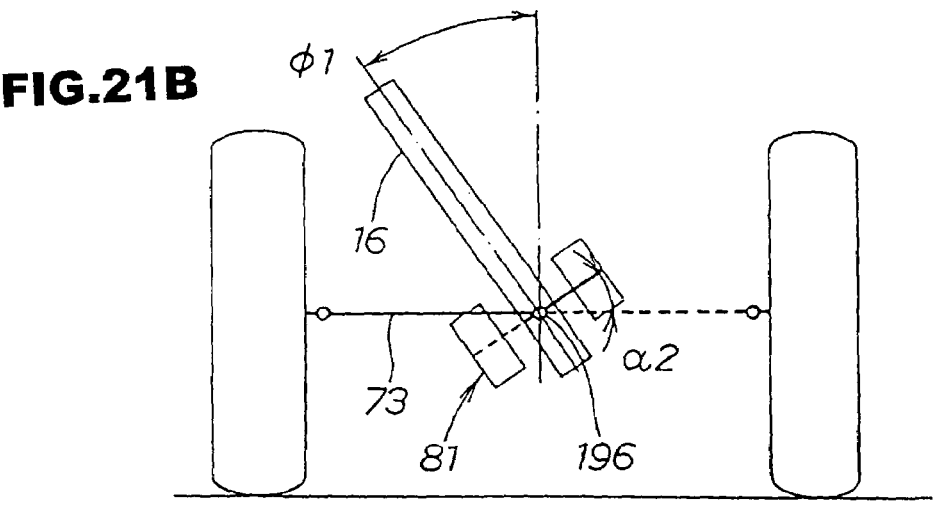
Figure 21C:
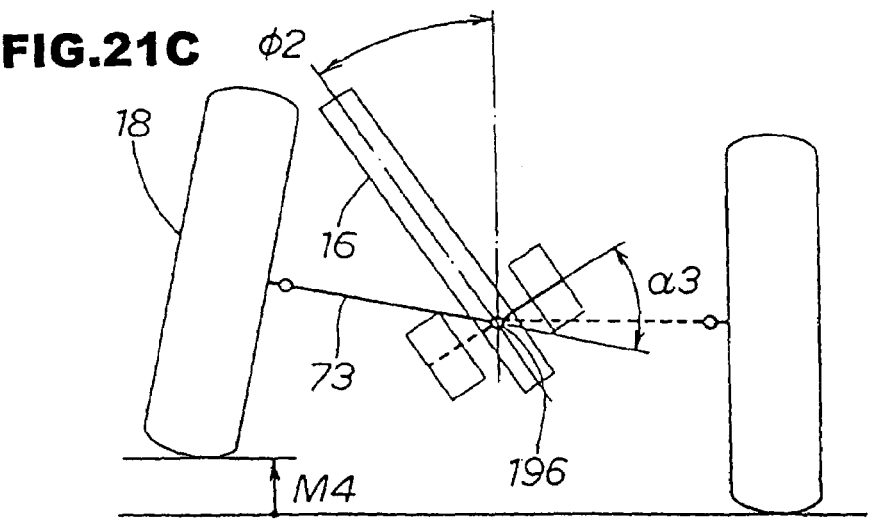
Figure 23:
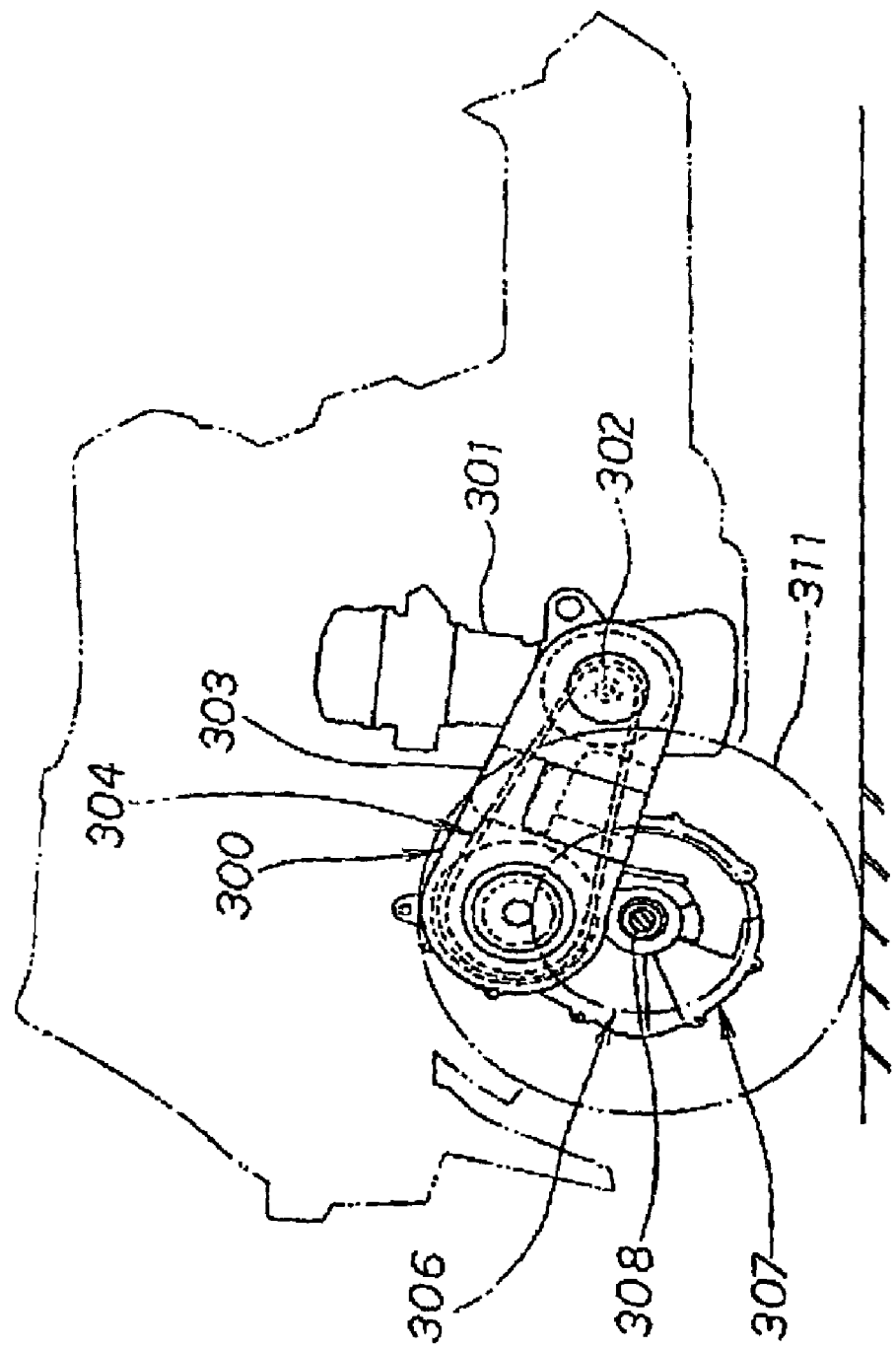
FIG. 23 is a side view for describing a structure of a power unit of a related art.

The following is a description of the operations of the drive shafts 73, 74, the left drive shaft 352 and the right drive shaft 353 described above. FIGS. 21(a) to (c) are explanatory drawings for describing the operation of a drive shaft (embodiment) of the present invention. In FIG. 21(a), if the rear wheel 18 on the left side moves upwards by movement amount M1, the drive shaft 73 bends at the constant velocity joint 196 and the angle of bend becomes $\alpha1$. In FIG. 21(b), if the vehicle frame 16 swings to the left side direction of the vehicle by angle $\phi1$, the gear box 81 swings together, the drive shaft 73 bends at the constant velocity joint 196 and the angle of bend becomes $\alpha2$.

In FIG. 21(c), if the rear wheel 18 goes up by movement amount M4 and the vehicle frame 16 swings to the left side direction of the vehicle by angle $\phi2$, the gear box 81 swings together, the drive shaft 73 bends at the constant velocity joint 196 and the angle of bend becomes $\alpha3$. This angle of bend $\phi3$ is within the permissible bend range.

FIGS. 22(a) to (c) are explanatory drawings for describing a drive shaft of a comparative example. In FIG. 22(a), if the rear wheel 361 on the left side goes upwards by movement amount M1, a left drive shaft 352 bends at a constant velocity joint 356 and the angle of bend becomes $\beta1$. In FIG. 22(b), if the vehicle frame 365 swings to the left side direction of the vehicle by angle $\phi1$, the gear box 351 swings together, the drive shaft 352 bends at the constant velocity joint 356 and the angle of bend becomes $\beta2$.

In FIG. 22(c), if the rear wheel 361 goes upwards by movement amount M4 and the vehicle frame 365 swings to the left side direction of the vehicle by angle $\phi2$, the gear box 351 swings together, the drive shaft 352 bends at the constant velocity joint 356 and the angle of bend becomes $\beta3$.

The comparison of the angle of bend $\beta3$ and the angle of bend $\alpha3$ shown in FIG. 21(c) becomes $\beta3>\alpha3$. Here, in order to make the angle of bend $\beta3$ become equal to the angle of bend $\alpha3$, the overall length of the drive shaft (numeral for this is taken as 352a) needs to be of length LL3. Namely, the width of the vehicle becomes large.

On the contrary, with the present invention as described in FIG. 13, since the connecting position of the drive shafts 73, 74 and the gear box 81 is made offset front and rear to the line connecting the rear wheels 18, 21 and the respective axles (i.e. inner shafts 195, 205), the drive shafts 73, 74 can be arranged diagonal to the direction of the vehicle width. Even though the overall length of the drive shafts 73, 74 becomes large, the tread of the rear wheels 18, 21 can be made small.

As described above in FIG. 12 and FIG. 14, in the present invention, there is provided a three-wheeled vehicle with a swing mechanism 10 (refer to FIG. 3) for transmitting drive force to wheels 18, 21 from an engine 34 side in the order of an infinitely variable transmission 78, a reduction gear mechanism 238 and a differential mechanism 172, having a vehicle frame 16 (refer to FIG. 3) mounted with left and right suspension arms 71, 72 in a moveable manner, the suspension arms 71, 72 being attached with rear wheels 18, 21 respectively, wherein the differential mechanism 172 is arranged below the infinitely variable transmission 78 and the reduction gear mechanism 238, and A-shaped front fitting parts 71a, 72a and rear fitting parts 71b, 72b for fitting suspension arms to the vehicle frame 16 are arranged to the front and rear of the differential mechanism 172.

It is possible to arrange front fitting parts 71a, 72a and rear fitting parts 71b, 72b for suspension arms in a relatively large space at the front and the rear of a differential mechanism 172 arranged below an infinitely variable transmission 78 and a reduction gear mechanism 238, so that even though the left and right suspension arms 71, 72 swing up and down, or the infinitely variable transmission 78 and the reduction gear mechanism 238 attached on the vehicle frame 16 swing left and right with respect to the suspension arms 71, 72, the infinitely variable transmission 78 and a reduction gear mechanism 238 do not interfere with the suspension arms 71, 72 and the vehicle frame 16 can swing left and right so that it is possible to easily construct a three-wheeled vehicle with a swing mechanism 10 having an independent suspension.

In particular, the front fitting parts 71a, 72a are provided by utilizing a space formed at a step section between the infinitely variable transmission 78 and the gear box 81, and it is therefore possible to arrange the suspension arms 71, 72 with respect to the power transmission mechanism 35 in a compact manner.

In the present invention, a differential mechanism is arranged below a transmission and a reduction gear mechanism. A-Shaped fitting parts for fitting suspension arms to a vehicle frame are arranged to the front and rear of the differential mechanism. Even though the left and right suspension arms swing up and down, or the transmission and the reduction gear mechanism attached on the vehicle frame swing left and right with respect to the suspension arms, it is therefore possible to prevent the transmission and the reduction gear mechanism from interfering with the suspension arms, and the vehicle frame can swing left and right so that it is possible to easily construct a vehicle having an independent suspension. In a vehicle with no reduction gear mechanism provided, a differential mechanism can be arranged below a transmission and fitting parts for fitting suspension arms to a vehicle frame may be arranged to the front and rear of the differential mechanism.

While the invention has been described in particular embodiments, it is to be understood that the words which have been used are words of description rather than limitation and that changes within the purview of the appended claims may be made without departing from the true scope and spirit of the invention in its broader aspects.

What is claimed is:

1. A suspension arrangement structure for a vehicle that transmits drive force to wheels from an engine side via a transmission, a reduction gear mechanism and a differential mechanism, the suspension arrangement structure comprising: a vehicle frame being mounted with left and right suspension arms in a moveable manner, each suspension arm being attached with a wheel, wherein the differential mechanism is arranged below the transmission and the reduction gear mechanism, and the suspension arms each include a front section and a rear section, each front section includes a front fitting part that is rotatably connected to the vehicle frame and each rear section includes a rear fitting part that is rotatably connected to the vehicle frame, the front and rear fitting parts arc arranged to the front and rear, respectively, of the differential mechanism, and wherein the front fitting parts or the rear fitting parts are rotatable about a common axis.

2. The suspension arrangement structure of claim 1 wherein the suspension antis are independently moveable with respect to each other.

3. The suspension arrangement structure of claim 1 wherein the suspension arms are independently moveable with respect to the vehicle frame.

4. The suspension arrangement structure of claim 1 wherein the wheels are driving wheels moveable independently in a vertical direction with respect to each other.

5. The suspension arrangement structure of claim 1 further comprising a shock absorber linked to the right and left suspension arms.

6. The suspension arrangement structure of claim 1 wherein the wheels are driving wheels moveable independently in a vertical direction with respect to the vehicle frame.

7. The suspension arrangement structure of claim 1 further comprising a swing mechanism operatively connected to the vehicle frame whereby the swing of the vehicle frame is prevented from becoming severe when the vehicle is cornering.

8. The suspension arrangement structure of claim 7 wherein the swing mechanism comprises a connecting member operatively connecting the swing mechanism and left and right suspension arms.

9. The suspension arrangement structure of claim 1, wherein the front fitting parts and the rear fitting parts are rotatable about a common axis.

10. The suspension arrangement structure of claim 1, wherein the front fitting parts are arranged above the rear fitting parts.

11. The suspension arrangement structure of claim 1, further comprising a left drive shaft and a right drive shaft connecting the differential mechanism with the wheels, and one of the left or right drive shafts is arranged in front of the differential mechanism and connects with a wheel, and the other one of the left or right drive shafts is arranged to a rear of the differential mechanism and connects with a wheel.

12. A suspension arrangement structure for a vehicle that transmits drive force to wheels from an engine side via a transmission, a reduction gear mechanism and a differential mechanism, the suspension arrangement structure comprising:
a vehicle frame;
left and right suspension arms mounted an the frame in a moveable manner, each suspension arm being attached with a wheel, end the suspension arms each include a front section and a rear section, each front section is rotatably connected to the vehicle frame and each rear section is rotatably connected to the vehicle frame;
a shock absorber linked to the right and left suspension arms;
the differential mechanism is arranged below the transmission and the reduction gear mechanism, and the front and rear sections are arranged to the front and rear, respectively, of the differential mechanism, and
a left drive shaft and a right drive shaft connecting the differential mechanism with the wheels, and one of the left or right drive shafts is arranged in front of the differential mechanism and connects with a wheel, and the other one of the left or right drive shafts is arranged to a rear of the differential mechanism and connects with a wheel.

13. The suspension arrangement structure of claim 12, wherein the front sections and the rear sections are rotatable about a common axis.

14. The suspension arrangement structure of claim 12, wherein each front section includes a front fitting part, each rear section includes a rear fitting part, and the front fining parts are arranged above the rear fitting pars.

* * * * *